United States Patent
Bayat-Sarmadi et al.

(10) Patent No.: US 11,228,432 B2
(45) Date of Patent: Jan. 18, 2022

(54) QUANTUM-RESISTANT CRYPTOPROCESSING

(71) Applicants: Siavash Bayat-Sarmadi, Tehran (IR); Shahriar Ebrahimi, Tehran (IR); Hatameh Mosanaei Boorani, Tehran (IR)

(72) Inventors: Siavash Bayat-Sarmadi, Tehran (IR); Shahriar Ebrahimi, Tehran (IR); Hatameh Mosanaei Boorani, Tehran (IR)

(*) Notice: Subject to any disclaimer, the term of this patent is extended or adjusted under 35 U.S.C. 154(b) by 129 days.

(21) Appl. No.: 16/807,394

(22) Filed: Mar. 3, 2020

(65) Prior Publication Data
US 2020/0204363 A1    Jun. 25, 2020

Related U.S. Application Data

(60) Provisional application No. 62/813,164, filed on Mar. 4, 2019.

(51) Int. Cl.
| | |
|---|---|
| H04L 9/08 | (2006.01) |
| G06F 9/30 | (2018.01) |
| H04L 9/00 | (2006.01) |

(52) U.S. Cl.
CPC ........ *H04L 9/0852* (2013.01); *G06F 9/30134* (2013.01); *H04L 9/002* (2013.01)

(58) Field of Classification Search
CPC .... H04L 9/0852; H04L 9/002; G06F 9/30134
USPC .......................................................... 380/28
See application file for complete search history.

(56) References Cited

U.S. PATENT DOCUMENTS

| | | | |
|---|---|---|---|
| 10,250,387 B1* | 4/2019 | Guerin | G09C 1/00 |
| 2007/0172053 A1* | 7/2007 | Poirier | G06F 21/72 |
| | | | 380/28 |
| 2010/0008497 A1* | 1/2010 | Takatsu | H04L 9/002 |
| | | | 380/42 |
| 2020/0044832 A1* | 2/2020 | Zhang | H04L 9/3073 |
| 2021/0099290 A1* | 4/2021 | Tomlinson | H04L 9/0825 |

FOREIGN PATENT DOCUMENTS

| | | | | |
|---|---|---|---|---|
| WO | WO-2015081505 A1 * | 6/2015 | ........... | H04L 9/0844 |
| WO | WO-2019107129 A1 * | 6/2019 | ........... | H04L 9/0822 |

OTHER PUBLICATIONS

Kabanov et al., "Practical Cryptographic Strategies in the Post-Quantum Era", arXiv.org, arXiv.1703.04285, Mar. 13, 2017, pp. 1-5. (Year: 2017).*
Pljonkin et al., "The General Principles of Quantum Key Integration into Data Network", IEEE, doi: 10.1109/ICCT46177.2019.8969011, 2019, pp. 308-312. (Year: 2019).*
Grote et al., "A Review of Post-quantum Cryptography and Crypto-agility Strategies", IEEE, doi: 10.1109/IIPHDW.2019.8755433, 2019, pp. 115-120. (Year: 2019).*

* cited by examiner

*Primary Examiner* — Peter C Shaw
(74) *Attorney, Agent, or Firm* — Bajwa IP Law Firm; Haris Zaheer Bajwa

(57) ABSTRACT

A logic circuit for quantum-resistant cryptoprocessing. The logic circuit includes a first plurality of multiplexers, a second plurality of multiplexers, a plurality of AND gates, a third plurality of multiplexers, a plurality of shift registers, a plurality of inverters, a fourth plurality of multiplexers, a plurality of adders, a plurality of XOR gates, a fifth plurality of multiplexers, and a plurality of parallel outputs.

4 Claims, 23 Drawing Sheets

QUANTUM-RESISTANT CRYPTOPROCESSING

CROSS-REFERENCE TO RELATED APPLICATION

This application claims the benefit of priority from U.S. Provisional Patent Application Ser. No. 62/813,164, filed on Mar. 4, 2019, and entitled "POST-QUANTUM CRYPTOPROCESSORS FOR IOT," which is incorporated herein by reference in its entirety.

TECHNICAL FIELD

The present disclosure generally relates to cryptoprocessing, and particularly, to binary Ring-LWE cryptoprocessing.

BACKGROUND

To implement secure channels for communications, a set of operations should be executed for cryptographic primitives such as public key encryption and decryption. Classic public key cryptosystems are computationally complex and may not be efficiently implemented on resource-constrained devices. Moreover, classic public key cryptosystems may rely on hard problems that may have polynomial time solutions using quantum search algorithm. Therefore, classic public key cryptosystems may not be quantum-resistant and may require very large keys to remain secure, which may not be practical due to hardware implementation complexity. There are alternative cryptosystems that rely on quantum-resistant hard problems. Ring learning with error (Ring-LWE) cryptosystems may rely on hardness of LWE problem. However, implementation of Ring-LWE may require some operations on ring of polynomials that may lead to high complexity. As a result, implementation of Ring-LWE on resource-constrained devices may be challenging.

There is, therefore, a need for a cryptoprocessing circuit that implements a quantum-resistant cryptoprocessing method with low complexity. There is also a need for a cryptoprocessing circuit that implements a quantum-resistant cryptoprocessing method with high speed.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary logic circuit for quantum-resistant cryptoprocessing. An exemplary logic circuit may include a first plurality of multiplexers, a second plurality of multiplexers, a plurality of AND gates, a third plurality of multiplexers, a plurality of shift registers, a plurality of inverters, a fourth plurality of multiplexers, a plurality of adders, a plurality of XOR gates, a fifth plurality of multiplexers, and a plurality of parallel outputs.

In an exemplary embodiment, an $(n,1)^{th}$ multiplexer of the first plurality of multiplexers may be configured to route one of an $i^{th}$ first random sequence of a plurality of first random sequences and an $i^{th}$ private sequence of a plurality of private sequences to an $(n,1)^{th}$ output utilizing a first selector input. An exemplary $i^{th}$ first random sequence may include b bits where b is a positive integer. In an exemplary embodiment, each bit of the $i^{th}$ first random sequence may be equal to an $i^{th}$ random bit of a first plurality of random bits. An exemplary $i^{th}$ private sequence may include the b bits. In an exemplary embodiment, each bit of the $i^{th}$ private sequence may be equal to an $i^{th}$ bit of a second plurality of bits, where $n \in [0,N-1]$, $i \in [0,N-1]$, and N is a number of the first plurality of bits.

In an exemplary embodiment, an $(n,2)^{th}$ multiplexer of the second plurality of multiplexers may be configured to route one of an $n^{th}$ public subsequence of a plurality of public subsequences, an $n^{th}$ public key sequence of a plurality of public key sequences, and an $n^{th}$ first ciphertext sequence of a plurality of first ciphertext sequences to an $(n,2)^{th}$ output utilizing a second selector input. Each exemplary public subsequence of the plurality of public subsequences may include the b bits and may represent a decimal number in a range of $$-\left\lfloor \frac{q}{2} \right\rfloor \text{ and } \left\lfloor \frac{q}{2} \right\rfloor - 1,$$

where $q=2^b$.

In an exemplary embodiment, an $n^{th}$ AND gate of the plurality of AND gates may be configured to generate an $n^{th}$ AND gate output by performing an AND operation on the $(n,1)^{th}$ output and the $(n,2)^{th}$ output. An exemplary $(n,3)^{th}$ multiplexer of the third plurality of multiplexers may be configured to route one of an $n^{th}$ second ciphertext sequence of a plurality of second ciphertext sequences, an $n^{th}$ temporary sequence of a plurality of temporary sequences, the $n^{th}$ AND gate output, an $n^{th}$ second random sequence of a plurality of second random sequences, an $n^{th}$ third random sequence of a plurality of third random sequences, and an $n^{th}$ message sequence of a plurality of message sequences to an $(n,3)^{th}$ output utilizing a third selector input. An exemplary $n^{th}$ temporary sequence may include the b bits. Each exemplary bit of the $n^{th}$ temporary sequence may be equal to an $n^{th}$ bit of the first plurality of bits. An exemplary $n^{th}$ second random sequence may include the b bits. Each exemplary bit of the $n^{th}$ second random sequence may be equal to an $n^{th}$ random bit of a second plurality of random bits. An exemplary $n^{th}$ third random sequence may include the b bits. Each exemplary bit of the $n^{th}$ third random sequence may be equal to an $n^{th}$ random bit of a third plurality of random bits. An exemplary $n^{th}$ message sequence may include the b bits.

In an exemplary embodiment, an $n^{th}$ shift register may be configured to generate an $n^{th}$ shift register output by storing an $n^{th}$ result sequence of a plurality of result sequences. An exemplary $n^{th}$ result sequence may include the b bits. An exemplary plurality of inverters may include a zeroth inverter and a $j^{th}$ inverter. An exemplary zeroth inverter may be configured to generate a zeroth inverter output by bit-wise inverting an $(N-1)^{th}$ shift register output of the plurality of shift register outputs. An exemplary $j^{th}$ inverter may be configured to generate a $j^{th}$ inverter output by bit-wise inverting a $(j-1)^{th}$ shift register output of the plurality of shift register outputs where $j \in [1,N-1]$.

In an exemplary embodiment, the fourth plurality of multiplexers may include a $(0,4)^{th}$ multiplexer and a $(j,4)^{th}$ multiplexer. An exemplary $(0,4)^{th}$ multiplexer may be configured to route one of the zeroth inverter output and the $(N-1)^{th}$ shift register output to a $(0,4)^{th}$ output utilizing a fourth selector input. An exemplary $(j,4)^{th}$ multiplexer may be configured to route one of the $j^{th}$ inverter output and the $(j-1)^{th}$ shift register output to a $(j,4)^{th}$ output utilizing the fourth selector input.

In an exemplary embodiment, an $n^{th}$ adder of the plurality of adders may be configured to generate an $n^{th}$ adder output by summing the $(n,3)^{th}$ output, an $(n,4)^{th}$ output, and an $n^{th}$ carry input. An exemplary $n^{th}$ adder output may be associated with the $n^{th}$ result sequence. An $n^{th}$ XOR gate of the plurality of XOR gates may be configured to generate an $n^{th}$ XOR gate output by performing an XOR operation on two most significant bits of the $n^{th}$ result sequence. An exemplary $(n,5)^{th}$ multiplexer of the fifth plurality of multiplexers may be configured to route one of the $n^{th}$ result sequence and the $n^{th}$ XOR gate output to an $(n,5)^{th}$ output utilizing a fifth selector input. An exemplary $n^{th}$ parallel output of the plurality of parallel outputs may be connected to the $(n,5)^{th}$ output.

Other exemplary systems, methods, features and advantages of the implementations will be, or will become, apparent to one of ordinary skill in the art upon examination of the following figures and detailed description. It is intended that all such additional systems, methods, features and advantages be included within this description and this summary, be within the scope of the implementations, and be protected by the claims herein.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1A:
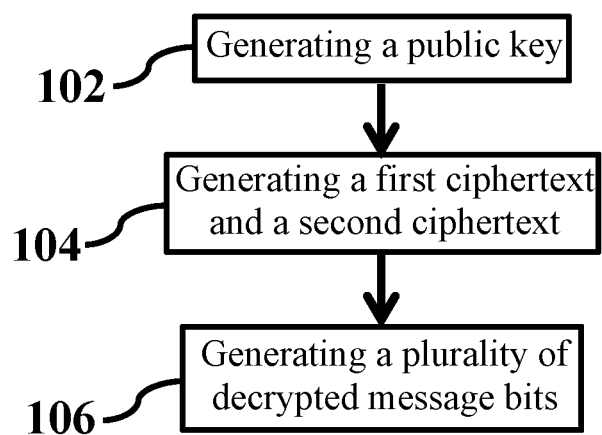
FIG. 1A shows a flowchart of a method for cryptoprocessing, consistent with one or more exemplary embodiments of the present disclosure.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Herein is disclosed exemplary method and circuits for quantum-resistant cryptoprocessing. An exemplary method aims to provide a secure channel between two entities and is based on binary ring learning with error (LWE) hard problem. The method may include a public key generation, an encryption, and a decryption. The method may perform the public key generation, the encryption, and the decryption by a multiplication and a summation over a ring of polynomials. The ring may utilize an inverted binary ring LWE that may eliminate a reduction operation resulting in hardware implementation efficiency. The multiplication may be performed by a shift and add method that may be performed by an anti-circular rotation. A set of sequences to be multiplied may be considered as coefficients of polynomials in a ring. Therefore, the anti-circular rotation may be performed by feeding a sequence of a leading coefficient to an adder generating a constant coefficient. On the other hand, each of other sequences may be fed to an adder generating a coefficient of one higher degree.

Two exemplary cryptoprocessing logic circuits are also disclosed. A parallel cryptoprocessing logic circuit may include N shift registers and N adders, where N is a number of message bits. An exemplary parallel cryptoprocessing logic circuit may perform a multiplication and a summation in a parallel manner that may lead to a high-speed cryptoprocessing. A serial cryptoprocessing logic circuit may perform a multiplication and a summation in a serial manner. The serial cryptoprocessing logic circuit may include a single shift register and a single adder and may be optimized for resource-constrained devices.

Figure 2:
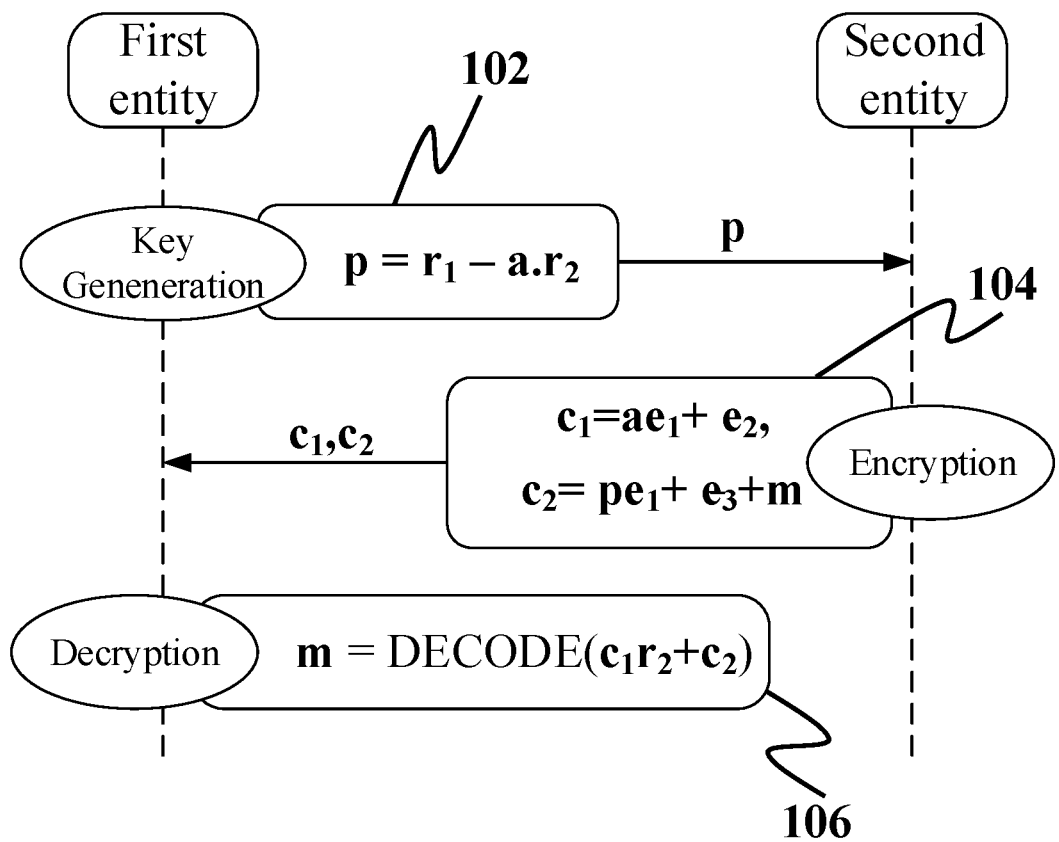
FIG. 2 shows a data flow diagram of a cryptoprocessing method, consistent with one or more exemplary embodiments of the present disclosure.

FIG. 1A shows a flowchart of a method for cryptoprocessing, consistent with one or more exemplary embodiments of the present disclosure. An exemplary method 100 may include generating a public key (step 102), generating a first ciphertext and a second ciphertext (step 104), and generating a plurality of decrypted message bits (step 106). FIG. 2 shows a data flow diagram of a cryptoprocessing method, consistent with one or more exemplary embodiments of the present disclosure. In an exemplary embodiment, method 100 may facilitate establishing a secure connection between a first entity and a second entity utilizing a cryptoprocessing method. In an exemplary embodiment, a public key p may be generated in the first entity by step 102. Next, an exemplary public key p may be sent to the second entity. In an exemplary embodiment, the second entity may then encrypt a message sequence by generating a first ciphertext $f_1$ and a second ciphertext $c_2$ and may send first ciphertext $c_1$ and second ciphertext $c_2$ to the first entity. Finally, the first entity may obtain a plurality of decrypted message bits m by decryption of first ciphertext $c_1$ and second ciphertext $c_2$.

Figure 1B:
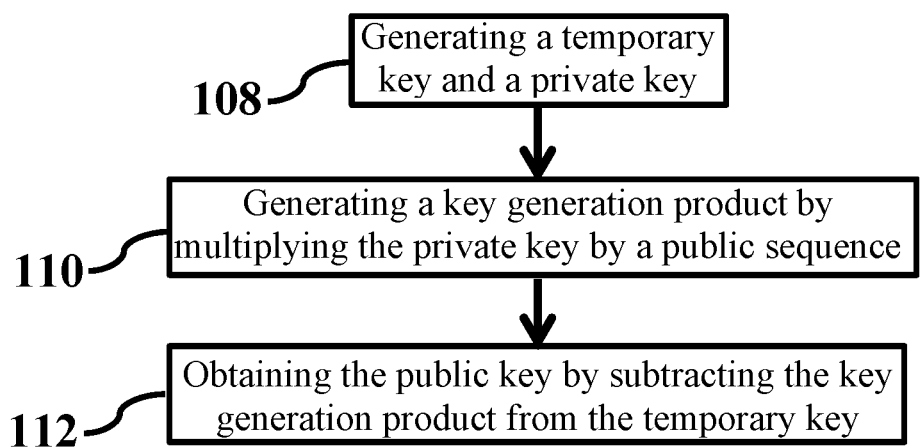
FIG. 1B shows a flowchart for generating a public key, consistent with one or more exemplary embodiments of the present disclosure.

For further detail with respect to step 102, FIG. 1B shows a flowchart for generating a public key, consistent with one or more exemplary embodiments of the present disclosure. Referring to FIGS. 1B and 2, in an exemplary embodiment, generating public key p may include generating a temporary key $r_1$ and a private key $r_2$ (step 108), generating a key generation product (step 110), and obtaining public key p (step 112). In an exemplary embodiment, temporary key $r_1$ and private key $r_2$ may be generated utilizing a processor. In an exemplary embodiment, temporary key $r_1$ may include a first plurality of bits. In an exemplary embodiment, each bit of the first plurality of bits may include a respective binary random variable. In an exemplary embodiment, private key $r_2$ may include a second plurality of bits. In an exemplary embodiment, each bit of the second plurality of bits may include a respective binary random variable. In an exemplary embodiment, a number of the second plurality of bits may be equal to a number of the first plurality of bits.

In an exemplary embodiment, the key generation product may be generated by multiplying private key $r_2$ by a public sequence a. In an exemplary embodiment, the key generation product may be generated utilizing a logic circuit. In an exemplary embodiment, public sequence a may include a plurality of public subsequences. In an exemplary embodiment, the key generation product may include a plurality of key generation sequences. In an exemplary embodiment, a number of the plurality of key generation sequences may be equal to a number of the first plurality of bits. In an exemplary embodiment, a number of the plurality of public subsequences may be equal to the number of the first plurality of bits. In an exemplary embodiment, each public subsequence of the plurality of public subsequences may include b bits and representing a decimal number in a range of $$-\left\lfloor \frac{q}{2} \right\rfloor \text{ and } \left\lfloor \frac{q}{2} \right\rfloor - 1,$$

where $q=2^b$ and b is a positive integer. In an exemplary embodiment, public key p may be obtained by subtracting the key generation product from temporary key $r_1$. In an exemplary embodiment, public key p may be obtained utilizing the logic circuit. In an exemplary embodiment, public key p may include a plurality of public key sequences.

Figure 1C:
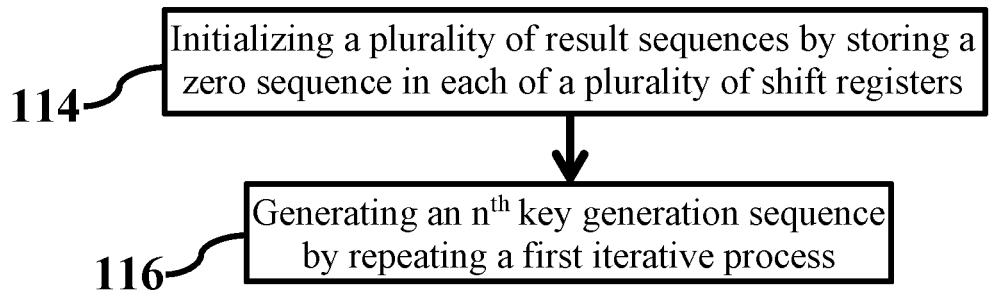
FIG. 1C shows a first flowchart of generating a key generation product, consistent with one or more exemplary embodiments of the present disclosure.
Figure 3:
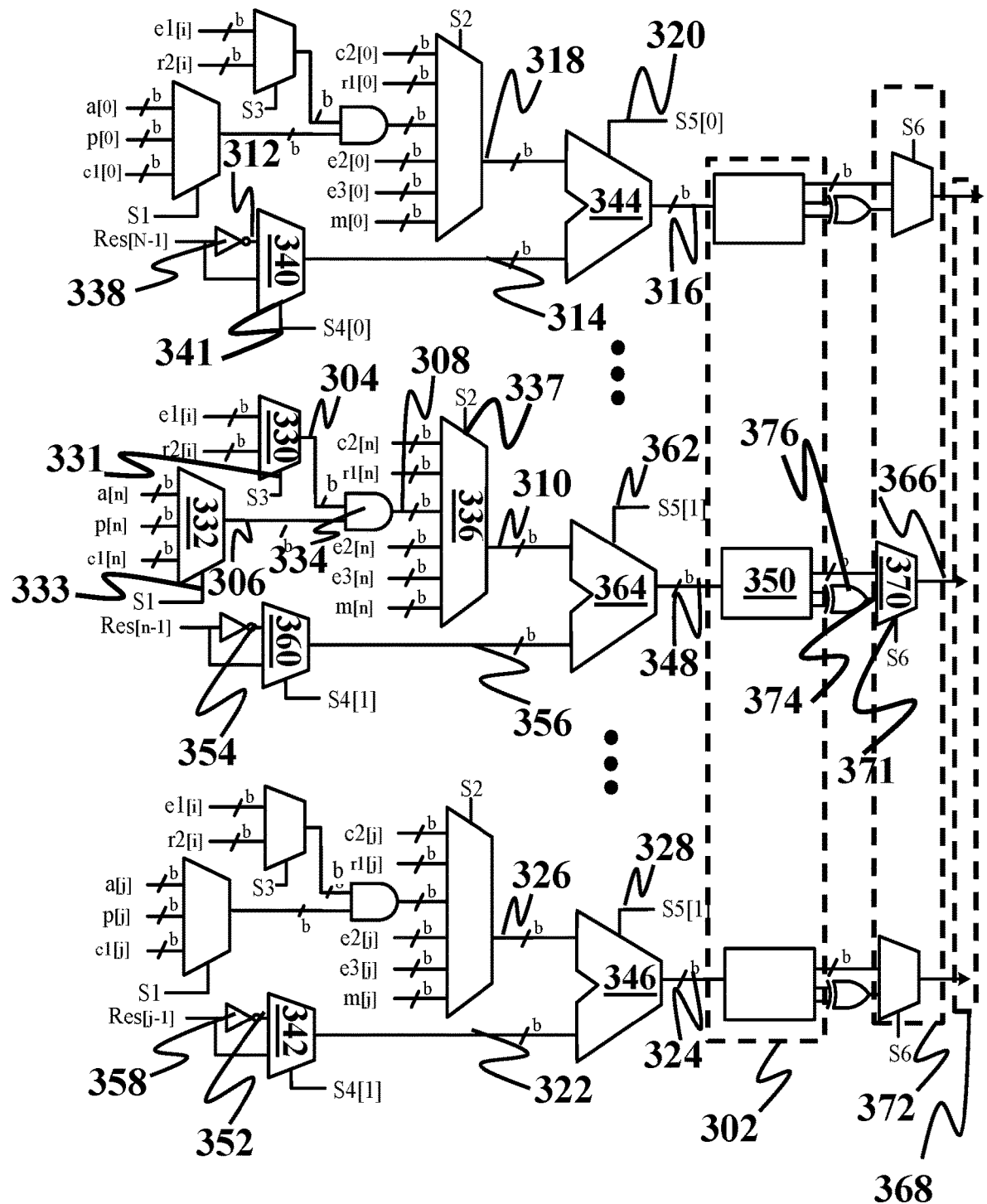
FIG. 3 shows a schematic of a parallel cryptoprocessing logic circuit, consistent with one or more exemplary embodiments of the present disclosure.

In further detail regarding step 110, FIG. 1C shows a first flowchart of generating a key generation product, consistent with one or more exemplary embodiments of the present disclosure. An exemplary method 110A may include a first implementation of step 110. FIG. 3 shows a schematic of a parallel cryptoprocessing logic circuit, consistent with one or more exemplary embodiments of the present disclosure. In an exemplary embodiment, different steps of method 100 may be implemented utilizing a parallel cryptoprocessing logic circuit 300. In an exemplary embodiment, generating the key generation product may include initializing a plurality of result sequences (step 114) and generating an $n^{th}$ key generation sequence of the plurality of key generation sequences (step 116). In an exemplary embodiment, the plurality of result sequences may be initialized by storing a zero sequence in each of a plurality of shift registers 302. In an exemplary embodiment, each shift register of a plurality of shift registers 302 may be associated with a respective result sequence of the plurality of result sequences. In an exemplary embodiment, each result sequence of the plurality of result sequences may be stored in a respective shift register. In an exemplary embodiment, the zero sequence may include the b bits, each bit of the zero sequence comprising a zero value.

For further detail with regards to step 116, in an exemplary embodiment, the $n^{th}$ key generation sequence may be generated by repeating a first iterative process for N times where N is the number of the first plurality of bits and $n \in [0, N-1]$. In an exemplary embodiment, the $n^{th}$ key generation sequence may be obtained by multiplying public sequence a by private key $r_2$. An exemplary $n^{th}$ key generation sequence may be associated with an $n^{th}$ result sequence res[n] of the plurality of result sequences. In an exemplary embodiment, $n^{th}$ result sequence res[n] may include $n^{th}$ key generation sequence when the first iterative process is performed. An exemplary $i^{th}$ iteration of the first iterative process, where 0≤i≤N−1, may include routing an $i^{th}$ private sequence $r_2[i]$ of a plurality of private sequences to an $(n,1)^{th}$ output 304, routing an $n^{th}$ public subsequence a[n] of plurality of public subsequences to an $(n,2)^{th}$ output 306, generating an $n^{th}$ AND gate output 308 by performing an AND operation on $(n,1)^{th}$ output 304 and $(n,2)^{th}$ output 306, routing $n^{th}$ AND gate output 308 to an $(n,3)^{th}$ output 310, generating a zeroth inverter output 312 by bit-wise inverting an $(N-1)^{th}$ result sequence res[N−1] of the plurality of result sequences, routing zeroth inverter output 312 to a $(0,4)^{th}$ output 314, routing a $(j-1)^{th}$ result sequence res[j−1] of the plurality of result sequences to a $(j,4)^{th}$ output 322, generating a zeroth adder output 316 by summing a $(0,3)^{th}$ output 318, $(0,4)^{th}$ output 314 and a zeroth carry input 320 equal to 1, generating a $j^{th}$ adder output 324 by summing a $(j,3)^{th}$ output 326, the $(j,4)^{th}$ output and a $j^{th}$ carry input 328 equal to 0, and updating $n^{th}$ result sequence res[n].

In an exemplary embodiment, the first iterative process may implement a shift and add method to obtain the $n^{th}$ key generation sequence. When a modulus of a ring of polynomials is chosen to be $1+x^N$, the shift operation may be performed by an anti-circular rotation over a set of coefficients of polynomials. Each coefficient of polynomials in the ring may include a number in a range of $$-\left\lfloor \frac{q}{2} \right\rfloor \text{ and } \left\lfloor \frac{q}{2} \right\rfloor - 1.$$

Therefore, the anti-circular operation may include a 2's complement of a coefficient of N−1 degree. In an exemplary embodiment, the first iterative process may perform the shift and add method for multiplying public sequence a by private key $r_2$. In doing so, in an exemplary embodiment, a bit-wise inverted $(N-1)^{th}$ result sequence res[N−1] may be fed to a zeroth adder with a carry input equal to 1 which may provide a 2's complement of an N−1 coefficient of the polynomial. Meanwhile, each result sequence of the plurality of result sequences (except $(N-1)^{th}$ result sequence res[N−1]) may be fed to a next adder to complete the anti-circular rotation. Repeating this process for N times may implement the shift and add method, which provides the multiplication result.

In an exemplary embodiment, $i^{th}$ private sequence $r_2[i]$ may be routed to $(n,1)^{th}$ output 304 utilizing an $(n,1)^{th}$ multiplexer 330 of a first plurality of multiplexers. In an exemplary embodiment, $(n,1)^{th}$ multiplexer 330 may route $i^{th}$ private sequence $r_2[i]$ utilizing a first selector input 331. In an exemplary embodiment, $(n,1)^{th}$ multiplexer 330 may route $i^{th}$ private sequence $r_2[i]$ to $(n,1)^{th}$ output 304 responsive to a third control sequence S3 loaded to first selector input 331. In an exemplary embodiment, third control sequence S3 may be equal to 1.

In an exemplary embodiment, $i^{th}$ private sequence $r_2[i]$ may include the b bits, each bit of $i^{th}$ private sequence $r_2[i]$ equal to an $i^{th}$ bit of the second plurality of bits. In an exemplary embodiment, $n^{th}$ public subsequence a[n] may be routed utilizing an $(n,2)^{th}$ multiplexer 332 of a second plurality of multiplexers. In an exemplary embodiment, $(n,2)^{th}$ multiplexer 332 may route $n^{th}$ public subsequence a[n] utilizing a second selector input 333. In an exemplary embodiment, $(n,2)^{th}$ multiplexer 332 may route $n^{th}$ public subsequence a[n] to $(n,2)^{th}$ output 306 responsive to a first control sequence S1 loaded to second selector input 333. In an exemplary embodiment, first control sequence S1 may be equal to 00. In an exemplary embodiment, $n^{th}$ AND gate output 308 may be generated utilizing an $n^{th}$ AND gate 334 of a plurality of AND gates. In an exemplary embodiment, $n^{th}$ AND gate output 308 may be routed utilizing an $(n,3)^{th}$ multiplexer 336 of a third plurality of multiplexers. In an exemplary embodiment, $(n,3)^{th}$ multiplexer 336 may route $n^{th}$ AND gate output 308 utilizing a third selector input 337. In an exemplary embodiment, $(n,3)^{th}$ multiplexer 336 may route $n^{th}$ AND gate output 308 to $(n,3)^{th}$ output 310 responsive to a second control sequence S2 loaded to third selector input 337. In an exemplary embodiment, second control sequence S2 may be equal to 010. In an exemplary embodiment, zeroth inverter output 312 may be bit-wise inverted utilizing a zeroth inverter 338 of a plurality of inverters. In an exemplary embodiment, zeroth inverter output 312 may be routed utilizing a $(0,4)^{th}$ multiplexer 340 of a fourth plurality of multiplexers. In an exemplary embodiment, $(0,4)^{th}$ multiplexer 340 may route zeroth inverter output 312 utilizing a fourth selector input 341. In an exemplary embodiment, $(0,4)^{th}$ multiplexer 340 may route zeroth inverter output 312 to $(0,4)^{th}$ output 314 responsive to a first element of a fourth control sequence S4 loaded to fourth selector input 341. In an exemplary embodiment, the first element of fourth control sequence S4 may be equal to 0.

In an exemplary embodiment, $(j-1)^{th}$ result sequence res[j−1] may be routed utilizing a $(j,4)^{th}$ multiplexer 342 of the fourth plurality of multiplexers, where 1≤j≤N−1. In an exemplary embodiment, $(j,4)^{th}$ multiplexer 342 may route $(j-1)^{th}$ result sequence res[j−1] utilizing fourth selector input 341. In an exemplary embodiment, $(j,4)^{th}$ multiplexer 342 may route $(j-1)^{th}$ result sequence res[j−1] to $(j,4)^{th}$ output 322 responsive to a second element of fourth control sequence S4 loaded to fourth selector input 341. In an exemplary embodiment, the second element of fourth control sequence S4 may be equal to 1. In an exemplary embodiment, zeroth adder output 316 may be generated utilizing a zeroth adder 344 of a plurality of adders. In an exemplary embodiment, $j^{th}$ adder output 324 may be generated utilizing a $j^{th}$ adder 346 of the plurality of adders. In an exemplary embodiment, $n^{th}$ result sequence res[n] may be updated by storing an $n^{th}$ adder output 348 in an $n^{th}$ shift register 350 of plurality of shift registers 302.

Figure 1D:
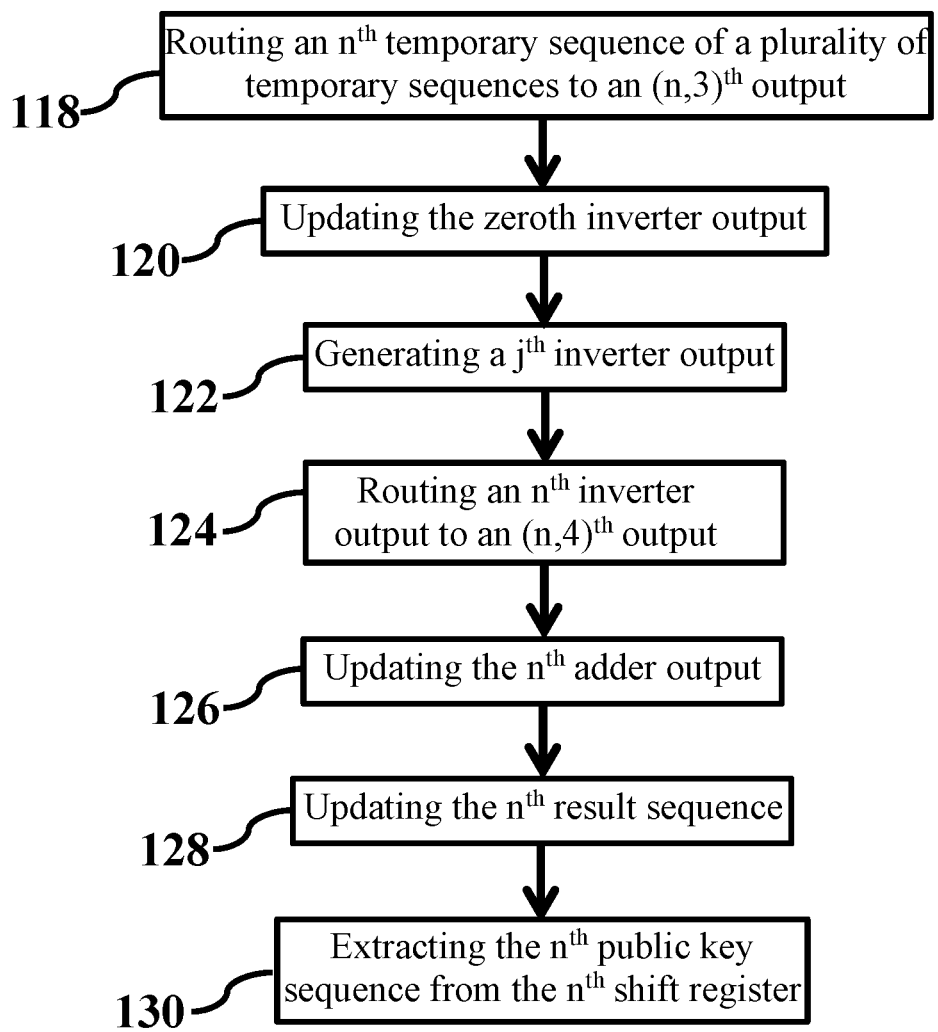
FIG. 1D shows a first flowchart of obtaining a public key sequence, consistent with one or more exemplary embodiments of the present disclosure.

For further detail with regards to step 112, FIG. 1D shows a first flowchart of obtaining a public key sequence, consistent with one or more exemplary embodiments of the present disclosure. An exemplary method 112A may include a first implementation of step 112. In an exemplary embodiment, different steps of method 112A may be implemented utilizing parallel cryptoprocessing logic circuit 300. In an exemplary embodiment, obtaining public key p may include obtaining an $n^{th}$ public key sequence p[n] of the plurality of public key sequences. In an exemplary embodiment, obtaining $n^{th}$ public key sequence p[n] may include routing an $n^{th}$ temporary sequence $r_1[n]$ of a plurality of temporary sequences to $(n,3)^{th}$ output 310 (step 118), updating zeroth inverter output 312 (step 120), generating a $j^{th}$ inverter output 352 (step 122), routing an $n^{th}$ inverter output 354 to an $(n,4)^{th}$ output 356 (step 124), updating $n^{th}$ adder output 348 (step 126), updating $n^{th}$ result sequence res[n] (step 128), and extracting $n^{th}$ public key sequence p[n] from $n^{th}$ shift register 350 (step 130).

In an exemplary embodiment, $n^{th}$ temporary sequence $r_1[n]$ may be routed to $(n,3)^{th}$ output 310. In an exemplary embodiment, $n^{th}$ temporary sequence $r_1[n]$ may be routed utilizing $(n,3)^{th}$ multiplexer 336. In an exemplary embodiment, $(n,3)^{th}$ multiplexer 336 may route $n^{th}$ temporary sequence $r_1[n]$ utilizing third selector input 337. In an exemplary embodiment, $(n,3)^{th}$ multiplexer 336 may route $n^{th}$ temporary sequence $r_1[n]$ to $(n,3)^{th}$ output 310 responsive to a second control sequence S2 loaded to third selector input 337. In an exemplary embodiment, second control sequence S2 may be equal to 001. An exemplary $n^{th}$ temporary sequence $r_1[n]$ may include the b bits. In an exemplary embodiment, each bit of $n^{th}$ temporary sequence $r_1[n]$ may be equal to an $n^{th}$ bit of the first plurality of bits. In an exemplary embodiment, zeroth inverter output 312 may be updated by bit-wise inverting $(N-1)^{th}$ result sequence res[N-1]. In an exemplary embodiment, zeroth inverter output 312 may be bit-wise inverted utilizing zeroth inverter 338. In an exemplary embodiment, $j^{th}$ inverter output 352 may be updated by bit-wise inverting $(j-1)^{th}$ result sequence res[j-1]. In an exemplary embodiment, $j^{th}$ inverter output 352 may be bit-wise inverted utilizing a $j^{th}$ inverter 358. In an exemplary embodiment, $n^{th}$ inverter output 354 may be routed utilizing an $(n,4)^{th}$ multiplexer 360 of the fourth plurality of multiplexers. In an exemplary embodiment $(n,4)^{th}$ multiplexer 360 may route $n^{th}$ inverter output 354 utilizing fourth selector input 341. In an exemplary embodiment, $(n,4)^{th}$ multiplexer 360 may route $n^{th}$ inverter output 354 to $(n,4)^{th}$ output 356 responsive to the second element of fourth control sequence S4 loaded to fourth selector input 341. In an exemplary embodiment, the second element of fourth control sequence S4 may be equal to 1.

In an exemplary embodiment, $n^{th}$ adder output 348 may updated by summing $(n,3)^{th}$ output 310, $(n,4)^{th}$ output 356, and an $n^{th}$ carry input 362 equal to 1. In an exemplary embodiment, $n^{th}$ adder output 348 may updated utilizing an $n^{th}$ adder 364. In an exemplary embodiment, $n^{th}$ result sequence res[n] may be updated by storing $n^{th}$ adder output 348 in $n^{th}$ shift register 350. In an exemplary embodiment, $n^{th}$ public key p[n] may be extracted by routing $n^{th}$ result sequence res[n] to an $n^{th}$ parallel output 366 of a plurality of parallel outputs 368. In an exemplary embodiment, $n^{th}$ result sequence res[n] may be routed to $n^{th}$ parallel output 366 utilizing an $(n,5)^{th}$ multiplexer 370 of a fifth plurality of multiplexers 372. In an exemplary embodiment, an $(n,5)^{th}$ multiplexer 370 may route $n^{th}$ result sequence res[n] to $n^{th}$ parallel output 366 utilizing a fifth selector input 371. In an exemplary embodiment, an $(n,5)^{th}$ multiplexer 370 may route $n^{th}$ result sequence res[n] to $n^{th}$ parallel output 366 responsive to a sixth control sequence S6 loaded to fifth selector input 371. In an exemplary embodiment, sixth control sequence S6 may be equal to 0.

Figure 3A:
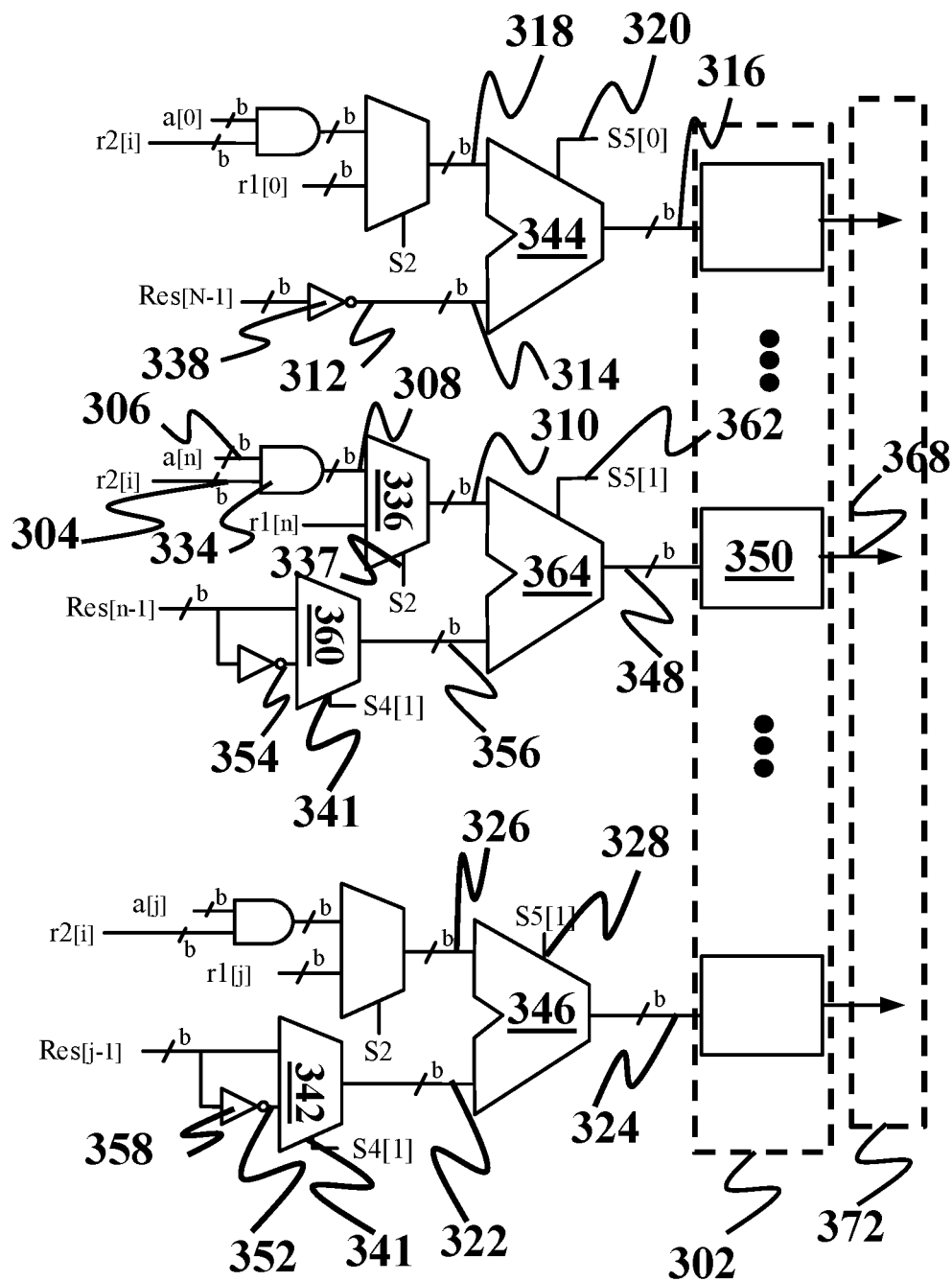
FIG. 3A shows a parallel key generation logic circuit, consistent with one or more exemplary embodiments of the present disclosure.

FIG. 3A shows a parallel key generation logic circuit, consistent with one or more exemplary embodiments of the present disclosure. In an exemplary embodiment, a parallel key generation logic circuit 300A may include a first implementation of parallel cryptoprocessing logic circuit 300. In an exemplary embodiment, different steps of method 102 may be implemented utilizing parallel key generation logic circuit 300A. In an exemplary embodiment, $i^{th}$ private sequence $r_2[i]$ may be routed to $(n,1)^{th}$ output 304 utilizing a direct connection. In other words, in an exemplary embodiment, $i^{th}$ private sequence $r_2[i]$ may be directly connected to $(n,1)^{th}$ output 304. In an exemplary embodiment, $n^{th}$ public subsequence a[n] may be routed to $(n,2)^{th}$ output 306 utilizing a direct connection. In an exemplary embodiment, zeroth inverter output 312 may be routed to $(0,4)^{th}$ output 314 utilizing a direct connection. In an exemplary embodiment, $n^{th}$ result sequence res[n] may be routed to $n^{th}$ parallel output 366 utilizing a direct connection.

Figure 1E:
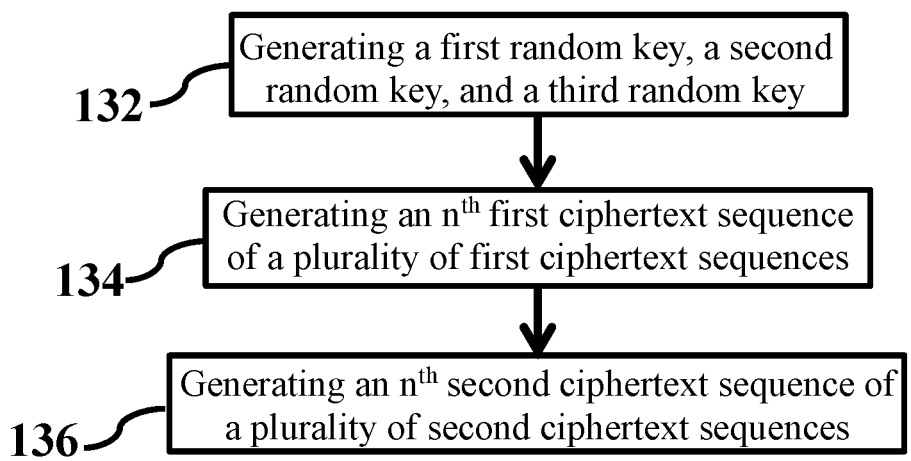
FIG. 1E shows a flowchart of generating a first ciphertext and a second ciphertext, consistent with one or more exemplary embodiments of the present disclosure.

FIG. 1E shows a flowchart of generating a first ciphertext and a second ciphertext, consistent with one or more exemplary embodiments of the present disclosure. Referring to FIG. 2, in an exemplary embodiment, step 104 may include an encryption of the message sequence by the second entity.

An exemplary first ciphertext $c_1$ may include a plurality of first ciphertext sequences. An exemplary second ciphertext $c_2$ may include a plurality of second ciphertext sequences. In an exemplary embodiment, generating first ciphertext $c_1$ and second ciphertext $c_2$ may include generating a first random key $e_1$, a second random key $e_2$, and a third random key $e_3$ (step 132), generating an $n^{th}$ first ciphertext sequence $c_1[n]$ of the plurality of first ciphertext sequences (step 134), and generating an $n^{th}$ second ciphertext sequence of the plurality of second ciphertext sequences (step 136).

In an exemplary embodiment, step 132 may be performed utilizing the processor. An exemplary first random key $e_1$ may include a first plurality of random bits. An exemplary second random key $e_2$ may include a second plurality of random bits. An exemplary third random key $e_3$ may include a third plurality of random bits. In an exemplary embodiment, each random bit of the first plurality of random bits, the second plurality of random bits, and the third plurality of random bits may include a respective binary random variable. In an exemplary embodiment, a number of the first plurality of random bits, a number of the second plurality of random bits, and a number of the third plurality of random bits may be equal to N.

Figure 1F:
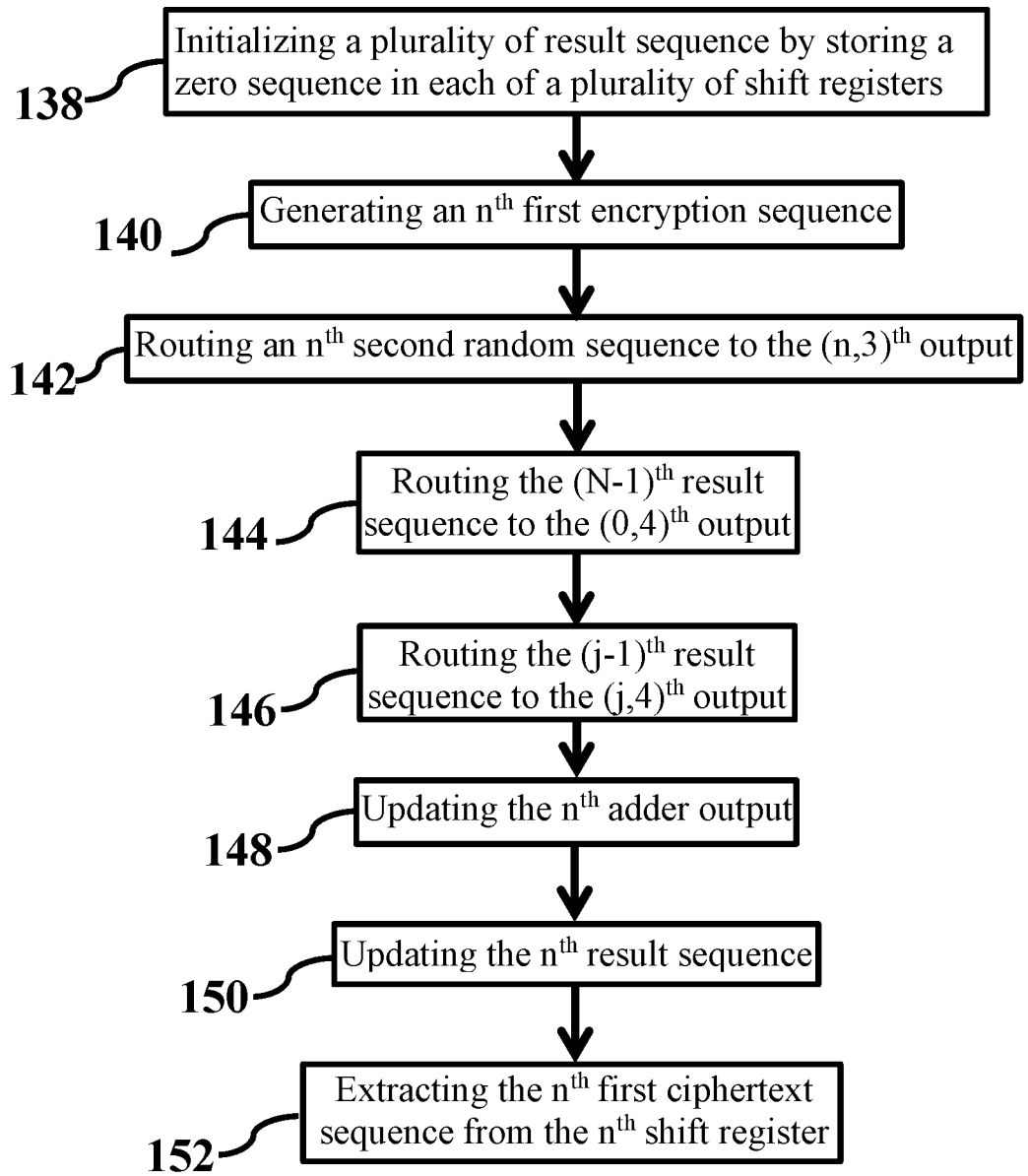
FIG. 1F shows a first flowchart of generating a first ciphertext sequence, consistent with one or more exemplary embodiments of the present disclosure.

In further detail with regards to step 134, FIG. 1F shows a first flowchart of generating a first ciphertext sequence, consistent with one or more exemplary embodiments of the present disclosure. An exemplary method 134A may include a first implementation of step 134. Referring to FIGS. 1F and 3, in an exemplary embodiment, generating $n^{th}$ first ciphertext sequence $c_1[n]$ may include initializing the plurality of result sequences (step 138), generating an $n^{th}$ first encryption sequence of a plurality of first encryption sequences (step 140), routing an $n^{th}$ second random sequence of a plurality of second random sequences to $(n,3)^{th}$ output 310 (step 142), routing $(N-1)^{th}$ result sequence res[N-1] to $(0,4)^{th}$ output 314 (step 144), routing $(j-1)^{th}$ result sequence res[j-1] to $(j,4)^{th}$ output 322 (step 146), updating $n^{th}$ adder output 348 (step 148), updating $n^{th}$ result sequence res[n] (step 150), and extracting $n^{th}$ first ciphertext sequence $c_1[n]$ from $n^{th}$ shift register 350 (step 152). In an exemplary embodiment, $n^{th}$ first ciphertext sequence $c_1[n]$ may be associated with $n^{th}$ result sequence res[n]. In an exemplary embodiment, $n^{th}$ result sequence res[n] may include the $n^{th}$ first ciphertext sequence $c_1[n]$ after performing step 134.

In an exemplary embodiment, the plurality of result sequences may be initialized by storing the zero sequence in each of the plurality of shift registers. An exemplary $n^{th}$ first encryption sequence may be associated with $n^{th}$ result sequence res[n]. In an exemplary embodiment, the plurality of first encryption sequences may include a multiplication result of public sequence a and first random key $e_1$, i.e., a first encryption product $ae_1$. An exemplary first encryption product $ae_1$ may include the plurality of first encryption sequences. As a result, $n^{th}$ result sequence res[n] may include the $n^{th}$ first encryption sequence after performing step 140. In an exemplary embodiment, a number of the plurality of first encryption sequences may be equal to N.

In an exemplary embodiment, generating the $n^{th}$ first encryption sequence may include repeating a second iterative process for N times. An exemplary $i^{th}$ iteration of the second iterative process may include routing an $i^{th}$ first random sequence $e_1[i]$ of a plurality of first random sequences to $(n,1)^{th}$ output 304, routing $n^{th}$ public subsequence a[n] to $(n,2)^{th}$ output 306, updating $n^{th}$ AND gate output 308, routing $n^{th}$ AND gate output 308 to $(n,3)^{th}$ output 310, updating zeroth inverter output 312, routing zeroth inverter output 312 to $(0,4)^{th}$ output 314, routing $(j-1)^{th}$ result sequence res[j−1] to $(j,4)^{th}$ output 322, updating zeroth adder output 316, updating $j^{th}$ adder output 324, updating $n^{th}$ result sequence res[n].

In an exemplary embodiment, $i^{th}$ first random sequence $e_1[i]$ may be routed to $(n,1)^{th}$ output 304 utilizing $(n,1)^{th}$ multiplexer 330. In an exemplary embodiment, $(n,1)^{th}$ multiplexer 330 may route $i^{th}$ first random sequence $e_1[i]$ utilizing first selector input 331. In an exemplary embodiment, $(n,1)^{th}$ multiplexer 330 may route $i^{th}$ first random sequence $e_1[i]$ to $(n,1)^{th}$ output 304 responsive to third control sequence S3 loaded to first selector input 331. In an exemplary embodiment, third control sequence S3 may be equal to 0. An exemplary $i^{th}$ first random sequence $e_1[i]$ may include the b bits. In an exemplary embodiment, each bit of $i^{th}$ first random sequence $e_1[i]$ may be equal to an $i^{th}$ random bit of the first plurality of random bits. An exemplary $n^{th}$ public subsequence a[n] may be routed to $(n,2)^{th}$ output 306 utilizing $(n,2)^{th}$ multiplexer 332. In an exemplary embodiment, $(n,2)^{th}$ multiplexer 332 may route $n^{th}$ public subsequence a[n] utilizing second selector input 333. In an exemplary embodiment, $(n,2)^{th}$ multiplexer 332 may route $n^{th}$ public subsequence a[n] to $(n,2)^{th}$ output 306 responsive to a first control sequence S1 loaded to second selector input 333. In an exemplary embodiment, first control sequence S1 may be equal to 00.

In an exemplary embodiment, $n^{th}$ AND gate output 308 may be updated by performing an AND operation on the $(n,1)^{th}$ output and the $(n,2)^{th}$ output. In an exemplary embodiment, $n^{th}$ AND gate output 308 may be updated utilizing $n^{th}$ AND gate 334. An exemplary $n^{th}$ AND gate output 308 may be routed to $(n,3)^{th}$ output 310 utilizing $(n,3)^{th}$ multiplexer 336. In an exemplary embodiment, $(n,3)^{th}$ multiplexer 336 may route $n^{th}$ AND gate output 308 utilizing third selector input 337. In an exemplary embodiment, $(n,3)^{th}$ multiplexer 336 may route $n^{th}$ AND gate output 308 to $(n,3)^{th}$ output 310 responsive to a second control sequence S2 loaded to third selector input 337. In an exemplary embodiment, second control sequence S2 may be equal to 010. In an exemplary embodiment, zeroth inverter output 312 may be updated by bit-wise inverting $(N−1)^{th}$ result sequence res[N−1]. In an exemplary embodiment, zeroth inverter output 312 may be updated utilizing zeroth inverter 338.

In an exemplary embodiment, zeroth inverter output 312 may be routed to $(0,4)^{th}$ output 314 utilizing $(0,4)^{th}$ multiplexer 340. In an exemplary embodiment, $(0,4)^{th}$ multiplexer 340 may route zeroth inverter output 312 utilizing fourth selector input 341. In an exemplary embodiment, $(0,4)^{th}$ multiplexer 340 may route zeroth inverter output 312 to $(0,4)^{th}$ output 314 responsive to the first element of fourth control sequence S4 loaded to fourth selector input 341. In an exemplary embodiment, the first element of fourth control sequence S4 may be equal to 0. In an exemplary embodiment, $(j−1)^{th}$ result sequence res[j−1] may be routed to $(j,4)^{th}$ output 322 utilizing $(j,4)^{th}$ multiplexer 342. In an exemplary embodiment, $(j,4)^{th}$ multiplexer 342 may route $(j−1)^{th}$ result sequence res[j−1] utilizing fourth selector input 341. In an exemplary embodiment, $(j,4)^{th}$ multiplexer 342 may route $(j−1)^{th}$ result sequence res[j−1] to $(j,4)^{th}$ output 322 responsive to the second element of fourth control sequence S4 loaded to fourth selector input 341. In an exemplary embodiment, the second element of fourth control sequence S4 may be equal to 1. In an exemplary embodiment, zeroth adder output 316 may be updated by summing $(0,3)^{th}$ output 318, $(0,4)^{th}$ output 314, and zeroth carry input 320 equal to 1. In an exemplary embodiment, zeroth adder output 316 may be updated utilizing zeroth adder 344. In an exemplary embodiment, $j^{th}$ adder output 324 may be updated by summing $(j,3)^{th}$ output 326, $(j,4)^{th}$ output 322, and $j^{th}$ carry input 328 to 0. In an exemplary embodiment, $j^{th}$ adder output 324 may be updated utilizing $j^{th}$ adder 346. In an exemplary embodiment, $n^{th}$ result sequence res[n] may be updated by storing $n^{th}$ adder output 348 in $n^{th}$ shift register 350.

In an exemplary embodiment, first ciphertext $c_1$ may be obtained by summing first encryption product $ae_1$ and second random key $e_2$. In an exemplary embodiment, steps 142-150 of method 134A may be performed to generate first ciphertext $c_1$ by summing first encryption product $ae_1$ and second random key $e_2$. In an exemplary embodiment, $n^{th}$ second random sequence $e_2[n]$ may be routed to $(n,3)^{th}$ output 310 utilizing $(n,3)^{th}$ multiplexer 336. In an exemplary embodiment, $(n,3)^{th}$ multiplexer 336 may route $n^{th}$ second random sequence $e_2[n]$ utilizing third selector input 337. In an exemplary embodiment, $(n,3)^{th}$ multiplexer 336 may route $n^{th}$ second random sequence $e_2[n]$ to $(n,3)^{th}$ output 310 responsive to a second control sequence S2 loaded to third selector input 337. In an exemplary embodiment, second control sequence S2 may be equal to 011. In an exemplary embodiment, each second random sequence of the plurality of second random sequences may include the b bits. In an exemplary embodiment, each bit of the $n^{th}$ second random sequence may be equal to an $n^{th}$ bit of the second plurality of random bits.

In an exemplary embodiment, $(N−1)^{th}$ result sequence res[N−1] may be routed to $(0,4)^{th}$ output 314 utilizing the $(0,4)^{th}$ multiplexer. In an exemplary embodiment, $(0,4)^{th}$ multiplexer 340 may route $(N−1)^{th}$ result sequence res[N−1] utilizing fourth selector input 341. In an exemplary embodiment, $(0,4)^{th}$ multiplexer 340 may route $(N−1)^{th}$ result sequence res[N−1] to $(0,4)^{th}$ output 314 responsive to the first element of fourth control sequence S4 loaded to fourth selector input 341. In an exemplary embodiment, the first element of fourth control sequence S4 may be equal to 1. In an exemplary embodiment, $(j−1)^{th}$ result sequence res[j−1] may be routed to $(j,4)^{th}$ output 322 utilizing $(j,4)^{th}$ multiplexer 342. In an exemplary embodiment, $(j,4)^{th}$ multiplexer 342 may route $(j−1)^{th}$ result sequence res[j−1] utilizing fourth selector input 341. In an exemplary embodiment, $(j,4)^{th}$ multiplexer 342 may route $(j−1)^{th}$ result sequence res[j−1] to $(j,4)^{th}$ output 322 responsive to the second element of fourth control sequence S4 loaded to fourth selector input 341. In an exemplary embodiment, the second element of fourth control sequence S4 may be equal to 1.

In an exemplary embodiment, $n^{th}$ adder output 348 may be updated by summing $(n,3)^{th}$ output 310, $(n,4)^{th}$ output 356, and $n^{th}$ carry input 362 equal to 0. In an exemplary embodiment, $n^{th}$ adder output 348 may be updated utilizing $n^{th}$ adder 364. In an exemplary embodiment, $n^{th}$ result sequence res[n] may be updated by storing $n^{th}$ adder output 348 in $n^{th}$ shift register 350. In an exemplary embodiment, $n^{th}$ first ciphertext sequence $c_1[n]$ may be extracted by routing $n^{th}$ result sequence res[n] to $n^{th}$ parallel output 366. In an exemplary embodiment, $n^{th}$ first ciphertext sequence $c_1[n]$ may be extracted utilizing an $(n,5)^{th}$ multiplexer 370. In an exemplary embodiment, an $(n,5)^{th}$ multiplexer 370 may route $n^{th}$ result sequence res[n] to $n^{th}$ parallel output 366 utilizing fifth selector input 371. In an exemplary embodiment, an $(n,5)^{th}$ multiplexer 370 may route $n^{th}$ result sequence res[n] to $n^{th}$ parallel output 366 responsive to sixth control sequence S6 loaded to fifth selector input 371. In an exemplary embodiment, sixth control sequence S6 may be equal to 0.

Figure 1G:
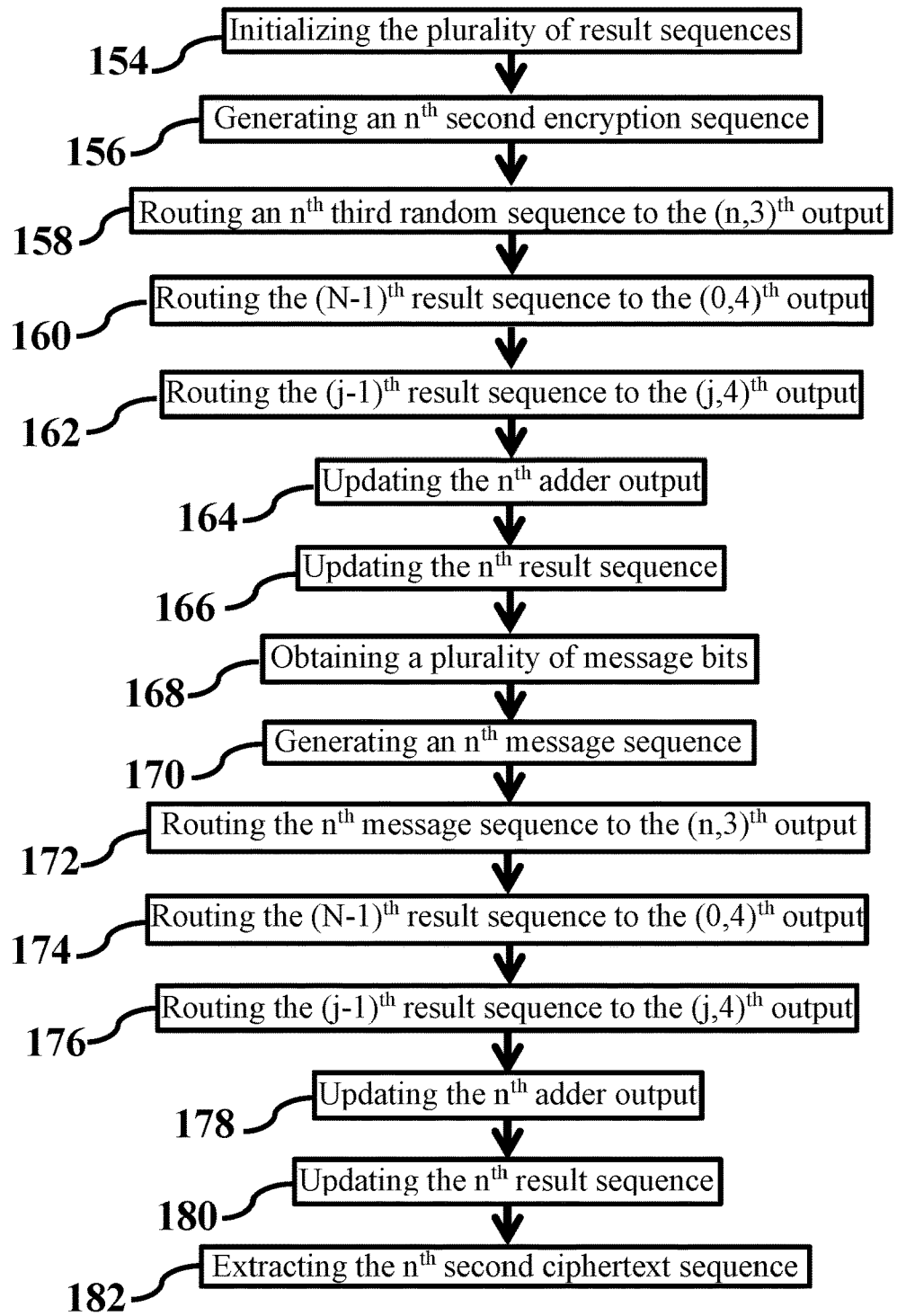
FIG. 1G shows a first flowchart of generating a second ciphertext sequence, consistent with one or more exemplary embodiments of the present disclosure.

For further detail with respect to step 136, FIG. 1G shows a first flowchart of generating a second ciphertext sequence, consistent with one or more exemplary embodiments of the present disclosure. An exemplary method 136A may include a first implementation of step 136. Referring to FIGS. 1G and 3, in an exemplary embodiment, generating $n^{th}$ second ciphertext sequence $c_2[n]$ may include initializing the plurality of result sequences (step 154), generating an $n^{th}$ second encryption sequence of a plurality of second encryption sequences (step 156), routing an $n^{th}$ third random sequence of a plurality of third random sequences to $(n,3)^{th}$ output 310 (step 158), routing $(N-1)^{th}$ result sequence res[N-1] to $(0,4)^{th}$ output 314 (step 160), routing $(j-1)^{th}$ result sequence res[j-1] to $(j,4)^{th}$ output 322 (step 162), updating $n^{th}$ adder output 348 (step 164), updating $n^{th}$ result sequence res[n] (step 166), obtaining, a plurality of message bits (step 168), generating an $n^{th}$ message sequence m[n] of a plurality of message sequences (step 170), routing $n^{th}$ message sequence m[n] to $(n,3)^{th}$ output 310 (step 172), routing $(N-1)^{th}$ result sequence res[N-1] to $(0,4)^{th}$ output 314 (step 174), routing $(j-1)^{th}$ result sequence res[j-1] to $(j,4)^{th}$ output 322 (step 176), updating $n^{th}$ adder output 348 (step 178), updating $n^{th}$ result sequence res[n] (step 180), extracting $n^{th}$ second ciphertext sequence $c_2[n]$ from $n^{th}$ shift register 350 (step 182). In an exemplary embodiment, $n^{th}$ second ciphertext sequence $c_2[n]$ may be associated with $n^{th}$ result sequence res[n]. In an exemplary embodiment, $n^{th}$ result sequence res[n] may include $n^{th}$ second ciphertext sequence $c_2[n]$ after performing step 136.

In an exemplary embodiment, the plurality of result sequences may be initialized by storing the zero sequence in each of the plurality of shift registers. An exemplary $n^{th}$ second encryption sequence may be associated with $n^{th}$ result sequence res[n]. In an exemplary embodiment, the plurality of second encryption sequences may include a multiplication result of public key sequence p and first random key $e_1$, i.e., a second encryption product $pe_1$. An exemplary second encryption product may include the plurality of second encryption sequences. As a result, $n^{th}$ result sequence res[n] may include the $n^{th}$ second encryption sequence after performing step 156. In an exemplary embodiment, a number of the plurality of second encryption sequences may be equal to N.

In an exemplary embodiment, generating the $n^{th}$ second encryption sequence may include repeating a third iterative process for N times. An exemplary $i^{th}$ iteration of the third iterative process may include routing an $i^{th}$ first random sequence $e_1[i]$ of a plurality of first random sequences to $(n,1)^{th}$ output 304, routing $n^{th}$ public key sequence p[n] to $(n,2)^{th}$ output 306, updating $n^{th}$ AND gate output 308, routing $n^{th}$ AND gate output 308 to $(n,3)^{th}$ output 310, updating zeroth inverter output 312, routing zeroth inverter output 312 to $(0,4)^{th}$ output 314, routing $(j-1)^{th}$ result sequence res[j-1] to $(j,4)^{th}$ output 322, updating zeroth adder output 316, updating $j^{th}$ adder output 324, updating $n^{th}$ result sequence res[n].

In an exemplary embodiment, $i^{th}$ first random sequence $e_1[i]$ may be routed to $(n,1)^{th}$ output 304 utilizing $(n,1)^{th}$ multiplexer 330. In an exemplary embodiment, $(n,1)^{th}$ multiplexer 330 may route $i^{th}$ first random sequence $e_1[i]$ utilizing first selector input 331. In an exemplary embodiment, $(n,1)^{th}$ multiplexer 330 may route $i^{th}$ first random sequence $e_1[i]$ to $(n,1)^{th}$ output 304 responsive to third control sequence S3 loaded to first selector input 331. In an exemplary embodiment, third control sequence S3 may be equal to 0. An exemplary $i^{th}$ first random sequence $e_1[i]$ may include the b bits. In an exemplary embodiment, each bit of $i^{th}$ first random sequence $e_1[i]$ may be equal to an $i^{th}$ random bit of the first plurality of random bits. An exemplary $n^{th}$ public key sequence p[n] may be routed to $(n,2)^{th}$ output 306 utilizing $(n,2)^{th}$ multiplexer 332. In an exemplary embodiment, $(n,2)^{th}$ multiplexer 332 may route $n^{th}$ public key sequence p[n] utilizing second selector input 333. In an exemplary embodiment, $(n,2)^{th}$ multiplexer 332 may route $n^{th}$ public key sequence p[n] to $(n,2)^{th}$ output 306 responsive to first control sequence S1 loaded to second selector input 333. In an exemplary embodiment, first control sequence may be equal to 01.

In an exemplary embodiment, $n^{th}$ AND gate output 308 may be updated by performing an AND operation on the $(n,1)^{th}$ output and the $(n,2)^{th}$ output. In an exemplary embodiment, $n^{th}$ AND gate output 308 may be updated utilizing $n^{th}$ AND gate 334. An exemplary $n^{th}$ AND gate output 308 may be routed to $(n,3)^{th}$ output 310 utilizing $(n,3)^{th}$ multiplexer 336. In an exemplary embodiment, $(n,3)^{th}$ multiplexer 336 may route $n^{th}$ AND gate output 308 utilizing third selector input 337. In an exemplary embodiment, $(n,3)^{th}$ multiplexer 336 may route $n^{th}$ AND gate output 308 to $(n,3)^{th}$ output 310 responsive to a second control sequence S2 loaded to third selector input 337. In an exemplary embodiment, second control sequence S2 may be equal to 010. In an exemplary embodiment, zeroth inverter output 312 may be updated by bit-wise inverting $(N-1)^{th}$ result sequence res[N-1]. In an exemplary embodiment, zeroth inverter output 312 may be updated utilizing zeroth inverter 338. In an exemplary embodiment, zeroth inverter output 312 may be routed to $(0,4)^{th}$ output 314 utilizing $(0,4)^{th}$ multiplexer 340. In an exemplary embodiment, $(0,4)^{th}$ multiplexer 340 may route zeroth inverter output 312 utilizing a fourth selector input 341. In an exemplary embodiment, $(0,4)^{th}$ multiplexer 340 may route zeroth inverter output 312 to $(0,4)^{th}$ output 314 responsive to the first element of fourth control sequence S4 loaded to fourth selector input 341. In an exemplary embodiment, the first element of fourth control sequence S4 may be equal to 0. In an exemplary embodiment, $(j-1)^{th}$ result sequence res[j-1] may be routed to $(j,4)^{th}$ output 322 utilizing $(j,4)^{th}$ multiplexer 342. In an exemplary embodiment, $(j,4)^{th}$ multiplexer 342 may route $(j-1)^{th}$ result sequence res[j-1] utilizing fourth selector input 341. In an exemplary embodiment, $(j,4)^{th}$ multiplexer 342 may route $(j-1)^{th}$ result sequence res[j-1] to $(j,4)^{th}$ output 322 responsive to the second element of fourth control sequence S4 loaded to fourth selector input 341. In an exemplary embodiment, the second element of fourth control sequence S4 may be equal to 1.

In an exemplary embodiment, zeroth adder output 316 may be updated by summing $(0,3)^{th}$ output 318, $(0,4)^{th}$ output 314, and zeroth carry input 320 equal to 1. In an exemplary embodiment, zeroth adder output 316 may be updated utilizing zeroth adder 344. In an exemplary embodiment, $j^{th}$ adder output 324 may be updated by summing $(j,3)^{th}$ output 326, $(j,4)^{th}$ output 322, and $j^{th}$ carry input 328 to 0. In an exemplary embodiment, $j^{th}$ adder output 324 may be updated utilizing $j^{th}$ adder 346. In an exemplary embodiment, $n^{th}$ result sequence res[n] may be updated by storing $n^{th}$ adder output 348 in $n^{th}$ shift register 350.

Referring again to FIG. 2, in an exemplary embodiment, second ciphertext $c_2$ may be obtained by summing second encryption product $pe_1$ and third random key $e_3$. In an exemplary embodiment, steps 148-166 may be performed to generate first ciphertext $c_2$ by summing second encryption product $pe_1$ and third random key $e_3$. In an exemplary embodiment, $n^{th}$ third random sequence $e_3[n]$ may be routed to $(n,3)^{th}$ output 310 utilizing $(n,3)^{th}$ multiplexer 336. In an exemplary embodiment, $(n,3)^{th}$ multiplexer 336 may route $n^{th}$ third random sequence $e_3[n]$ utilizing third selector input 337. In an exemplary embodiment, $(n,3)^{th}$ multiplexer 336 may route $n^{th}$ third random sequence $e_3[n]$ to $(n,3)^{th}$ output 310 responsive to a second control sequence S2 loaded to third selector input 337. In an exemplary embodiment, second control sequence S2 may be equal to 100.

In an exemplary embodiment, each third random sequence of the plurality of third random sequences may include the b bits. In an exemplary embodiment, each bit of the $n^{th}$ third random sequence may be equal to an $n^{th}$ bit of the second plurality of random bits. In an exemplary embodiment, $n^{th}$ message sequence m[n] may be routed to $(n,3)^{th}$ output 310 utilizing $(n,3)^{th}$ multiplexer 336. In an exemplary embodiment, $(n,3)^{th}$ multiplexer 336 may route $n^{th}$ message sequence m[n] utilizing third selector input 337. In an exemplary embodiment, $(n,3)^{th}$ multiplexer 336 may route $n^{th}$ message sequence m[n] to $(n,3)^{th}$ output 310 responsive to a second control sequence S2 loaded to third selector input 337. In an exemplary embodiment, second control sequence S2 may be equal to 101.

In an exemplary embodiment, $(N-1)^{th}$ result sequence res[N-1] may be routed to $(0,4)^{th}$ output 314 utilizing $(0,4)^{th}$ multiplexer. In an exemplary embodiment, $(0,4)^{th}$ multiplexer 340 may route $(N-1)^{th}$ result sequence res[N-1] utilizing fourth selector input 341. In an exemplary embodiment, $(0,4)^{th}$ multiplexer 340 may route $(N-1)^{th}$ result sequence res[N-1] to $(0,4)^{th}$ output 314 responsive to the first element of fourth control sequence S4 loaded to fourth selector input 341. In an exemplary embodiment, the first element of fourth control sequence S4 may be equal to 1. In an exemplary embodiment, $(j-1)^{th}$ result sequence res[j-1] may be routed to $(j,4)^{th}$ output 322 utilizing $(j,4)^{th}$ multiplexer 342. In an exemplary embodiment, $(j,4)^{th}$ multiplexer 342 may route $(j-1)^{th}$ result sequence res[j-1] utilizing fourth selector input 341. In an exemplary embodiment, $(j,4)^{th}$ multiplexer 342 may route $(j-1)^{th}$ result sequence res[j-1] to $(j,4)^{th}$ output 322 responsive to the second element of fourth control sequence S4 loaded to fourth selector input 341. In an exemplary embodiment, the second element of fourth control sequence S4 may be equal to 1. In an exemplary embodiment, $n^{th}$ adder output 348 may be updated by summing $(n,3)^{th}$ output 310, $(n,4)^{th}$ output 356, and $n^{th}$ carry input 362 equal to 0. In an exemplary embodiment, $n^{th}$ adder output 348 may be updated utilizing $n^{th}$ adder 364. In an exemplary embodiment, $n^{th}$ result sequence res[n] may be updated by storing $n^{th}$ adder output 348 in $n^{th}$ shift register 350.

In an exemplary embodiment, the plurality of message bits may be obtained utilizing the processor. In an exemplary embodiment, $n^{th}$ message sequence m[n] may be generated by the processor. In an exemplary embodiment, $n^{th}$ message sequence m[n] may include the b bits. In an exemplary embodiment, generating $n^{th}$ message sequence m[n] may include setting $n^{th}$ message sequence m[n] to a binary value of a decimal number equal to $$-\left\lfloor \frac{q}{2} \right\rfloor$$

responsive to an $n^{th}$ message bit of the plurality of message bits equal to 1. In an exemplary embodiment, generating $n^{th}$ message sequence m[n] may further include setting $n^{th}$ message sequence m[n] to the zero sequence responsive to the $n^{th}$ message bit equal to 0.

In an exemplary embodiment, $n^{th}$ second ciphertext sequence $c_2[n]$ may be extracted from $n^{th}$ shift register 350 by routing $n^{th}$ result sequence res[n] to $n^{th}$ parallel output 366. In an exemplary embodiment, $n^{th}$ result sequence res[n] may be routed to $n^{th}$ parallel output 366 utilizing an $(n,5)^{th}$ multiplexer 370. In an exemplary embodiment, an $(n,5)^{th}$ multiplexer 370 may route $n^{th}$ result sequence res[n] to $n^{th}$ parallel output 366 utilizing fifth selector input 371. In an exemplary embodiment, an $(n,5)^{th}$ multiplexer 370 may route $n^{th}$ result sequence res[n] to $n^{th}$ parallel output 366 responsive to sixth control sequence S6 loaded to fifth selector input 371. In an exemplary embodiment, sixth control sequence S6 may be equal to 0.

Figure 3B:
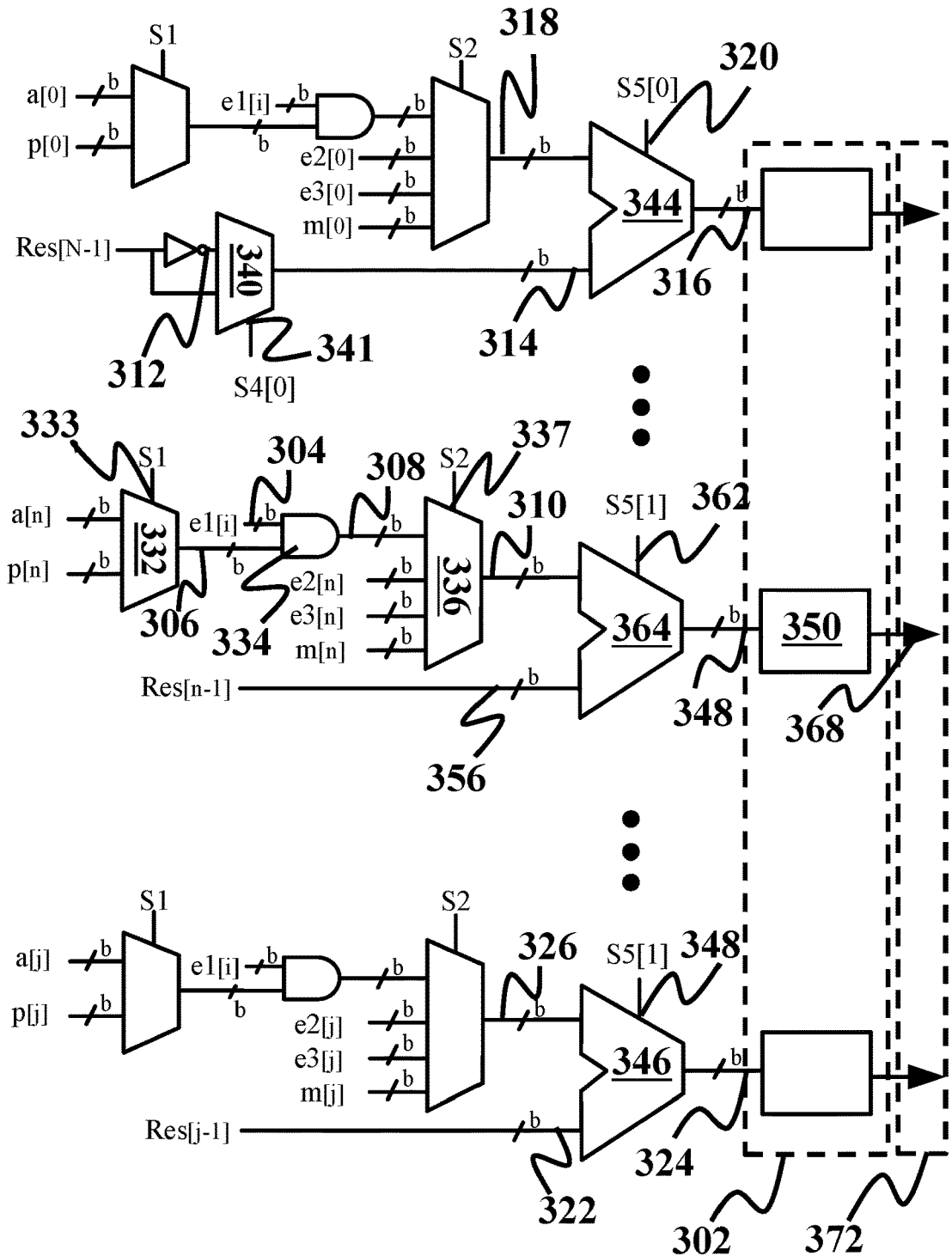
FIG. 3B shows a parallel encryption logic circuit, consistent with one or more exemplary embodiments of the present disclosure.

FIG. 3B shows a parallel encryption logic circuit, consistent with one or more exemplary embodiments of the present disclosure. In an exemplary embodiment, a parallel encryption logic circuit 300B may include a second implementation of parallel cryptoprocessing logic circuit 300. In an exemplary embodiment, different steps of method 104 may be implemented utilizing parallel encryption logic circuit 300B. In an exemplary embodiment, $i^{th}$ first random sequence $e_1[i]$ may be routed to $(n,1)^{th}$ output 304 utilizing a direct connection. In other words, in an exemplary embodiment, $i^{th}$ first random sequence $e_1[i]$ may be directly connected to $(n,1)^{th}$ output 304. In an exemplary embodiment, $(j-1)^{th}$ result sequence res[j-1] may be routed to $(j,4)^{th}$ output 322 utilizing a direct connection. In an exemplary embodiment, $n^{th}$ result sequence res[n] may be routed to $n^{th}$ parallel output 366 utilizing a direct connection.

Figure 1H:
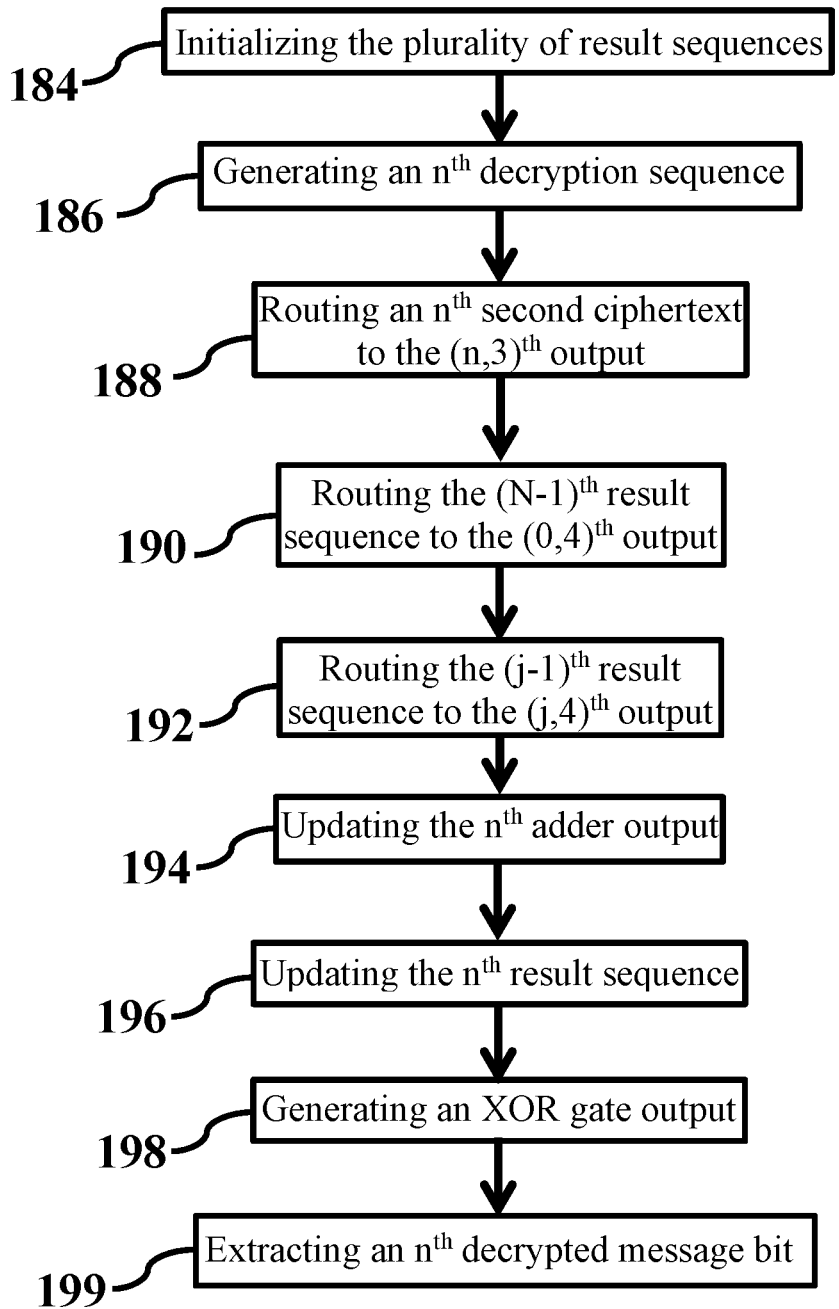
FIG. 1H shows a first flowchart of generating a plurality of decrypted message bits, consistent with one or more exemplary embodiments of the present disclosure.

In further detail with regards to step 106, FIG. 1H shows a first flowchart of generating a plurality of decrypted message bits, consistent with one or more exemplary embodiments of the present disclosure. An exemplary method 106A may include a first implementation of step 106. Referring to FIGS. 1H and 3, in an exemplary embodiment, generating a plurality of decrypted message bits may include initializing the plurality of result sequences (step 184), generating an $n^{th}$ decryption sequence of a plurality of decryption sequences (step 186), routing $n^{th}$ second ciphertext $c_2[n]$ to $(n,3)^{th}$ output 310 (step 188), routing $(N-1)^{th}$ result sequence res[N-1] to $(0,4)^{th}$ output 314 (step 190), routing $(j-1)^{th}$ result sequence res[j-1] to $(j,4)^{th}$ output 322 (step 192), updating $n^{th}$ adder output 348 (step 194), updating $n^{th}$ result sequence res[n] (step 196), generating an $n^{th}$ XOR gate output 374 (step 198), and extracting $n^{th}$ decrypted message bit (step 199).

In an exemplary embodiment, the plurality of result sequences may be initialized by storing the zero sequence in each of the plurality of shift registers. An exemplary $n^{th}$ decryption sequence may be associated with $n^{th}$ result sequence res[n]. In an exemplary embodiment, the plurality of decryption sequences may include a multiplication result of first ciphertext $c_1$ and private key $r_2$, i.e., a decryption product $c_1 r_2$. An exemplary decryption product $c_1 r_2$ may include the plurality of decryption sequences. As a result, $n^{th}$ result sequence res[n] may include the $n^{th}$ decryption sequence after performing step 186. In an exemplary embodiment, a number of the plurality of decryption sequences may be equal to N.

In an exemplary embodiment, generating the $n^{th}$ decryption sequence may include repeating a fourth iterative process for N times. An exemplary $i^{th}$ iteration of the fourth iterative process may include routing $i^{th}$ private sequence $r_2[i]$ to $(n,1)^{th}$ output 304, routing $n^{th}$ first ciphertext sequence $c_1[n]$ to $(n,2)^{th}$ output 306, updating $n^{th}$ AND gate output 308, routing $n^{th}$ AND gate output 308 to $(n,3)^{th}$ output 310, updating zeroth inverter output 312, routing zeroth inverter output 312 to $(0,4)^{th}$ output 314, routing $(j-1)^{th}$ result sequence res[j-1] to $(j,4)^{th}$ output 322, updating zeroth adder output 316, updating $j^{th}$ adder output 324, updating $n^{th}$ result sequence res[n].

In an exemplary embodiment, $i^{th}$ private sequence $r_2[i]$ may be routed to $(n,1)^{th}$ output 304 utilizing $(n,1)^{th}$ multiplexer 330. In an exemplary embodiment, $(n,1)^{th}$ multiplexer 330 may route $i^{th}$ first random sequence $r_2[i]$ utilizing first selector input 331. In an exemplary embodiment, $(n,1)^{th}$ multiplexer 330 may route $i^{th}$ private sequence $r_2[i]$ to $(n,1)^{th}$ output 304 responsive to third control sequence S3 loaded to first selector input 331. In an exemplary embodiment, third control sequence S3 may be equal to 1. An exemplary $n^{th}$ first ciphertext sequence $c_1[n]$ may be routed to $(n,2)^{th}$ output 306 utilizing $(n,2)^{th}$ multiplexer 332. In an exemplary embodiment, $(n,2)^{th}$ multiplexer 332 may route $n^{th}$ first ciphertext sequence $c_1[n]$ utilizing second selector input 333. In an exemplary embodiment, $(n,2)^{th}$ multiplexer 332 may route $n^{th}$ first ciphertext sequence $c_1[n]$ to $(n,2)^{th}$ output 306 responsive to first control sequence S1 loaded to second selector input 333. In an exemplary embodiment, first control sequence S1 may be equal to 10.

In an exemplary embodiment, $n^{th}$ AND gate output 308 may be updated by performing an AND operation on the $(n,1)^{th}$ output and the $(n,2)^{th}$ output. In an exemplary embodiment, $n^{th}$ AND gate output 308 may be updated utilizing $n^{th}$ AND gate 334. An exemplary $n^{th}$ AND gate output 308 may be routed to $(n,3)^{th}$ output 310 utilizing $(n,3)^{th}$ multiplexer 336. In an exemplary embodiment, $(n,3)^{th}$ multiplexer 336 may route $n^{th}$ AND gate output 308 utilizing third selector input 337. In an exemplary embodiment, $(n,3)^{th}$ multiplexer 336 may route $n^{th}$ AND gate output 308 to $(n,3)^{th}$ output 310 responsive to a second control sequence S2 loaded to third selector input 337. In an exemplary embodiment, second control sequence S2 may be equal to 010. In an exemplary embodiment, zeroth inverter output 312 may be updated by bit-wise inverting $(N-1)^{th}$ result sequence res[N-1]. In an exemplary embodiment, zeroth inverter output 312 may be updated utilizing zeroth inverter 338.

In an exemplary embodiment, zeroth inverter output 312 may be routed to $(0,4)^{th}$ output 314 utilizing $(0,4)^{th}$ multiplexer 340. In an exemplary embodiment, $(0,4)^{th}$ multiplexer 340 may route zeroth inverter output 312 utilizing fourth selector input 341. In an exemplary embodiment, $(0,4)^{th}$ multiplexer 340 may route zeroth inverter output 312 to $(0,4)^{th}$ output 314 responsive to the first element of fourth control sequence S4 loaded to fourth selector input 341. In an exemplary embodiment, the first element of fourth control sequence S4 may be equal to 0. In an exemplary embodiment, $(j-1)^{th}$ result sequence may be routed to $(j,4)^{th}$ output 322 utilizing $(j,4)^{th}$ multiplexer 342. In an exemplary embodiment, $(j,4)^{th}$ multiplexer 342 may route $(j-1)^{th}$ result sequence res[j-1] utilizing fourth selector input 341. In an exemplary embodiment, $(j,4)^{th}$ multiplexer 342 may route $(j-1)^{th}$ result sequence res[j-1] to $(j,4)^{th}$ output 322 responsive to the second element of fourth control sequence S4 loaded to fourth selector input 341. In an exemplary embodiment, the second element of fourth control sequence S4 may be equal to 1.

In an exemplary embodiment, zeroth adder output 316 may be updated by summing $(0,3)^{th}$ output 318, $(0,4)^{th}$ output 314, and zeroth carry input 320 equal to 1. In an exemplary embodiment, zeroth adder output 316 may be updated utilizing zeroth adder 344. In an exemplary embodiment, $j^{th}$ adder output 324 may be updated by summing $(j,3)^{th}$ output 326, $(j,4)^{th}$ output 322, and $j^{th}$ carry input 328 to 0. In an exemplary embodiment, $j^{th}$ adder output 324 may be updated utilizing $j^{th}$ adder 346. In an exemplary embodiment, $n^{th}$ result sequence res[n] may be updated by storing $n^{th}$ adder output 348 in $n^{th}$ shift register 350.

In an exemplary embodiment, the plurality of decrypted message bits may be obtained by summing decryption product $c_1 r_2$ and second ciphertext $c_2$. In an exemplary embodiment, steps 188-196 may be performed to generate the plurality of decrypted message bits by summing decryption product $c_1 r_2$ and second ciphertext $c_2$. In an exemplary embodiment, $n^{th}$ second ciphertext sequence $c_2[n]$ may be routed to $(n,3)^{th}$ output 310 utilizing $(n,3)^{th}$ multiplexer 336. In an exemplary embodiment, $(n,3)^{th}$ multiplexer 336 may route $n^{th}$ second ciphertext sequence $c_2[n]$ utilizing third selector input 337. In an exemplary embodiment, $(n,3)^{th}$ multiplexer 336 may route $n^{th}$ second ciphertext sequence $c_2[n]$ to $(n,3)^{th}$ output 310 responsive to a second control sequence S2 loaded to third selector input 337. In an exemplary embodiment, second control sequence S2 may be equal to 000.

In an exemplary embodiment, $(N-1)^{th}$ result sequence res[N-1] may be routed to $(0,4)^{th}$ output 314 utilizing the $(0,4)^{th}$ multiplexer. In an exemplary embodiment, $(0,4)^{th}$ multiplexer 340 may route $(N-1)^{th}$ result sequence res[N-1] utilizing fourth selector input 341. In an exemplary embodiment, $(0,4)^{th}$ multiplexer 340 may route $(N-1)^{th}$ result sequence res[N-1] to $(0,4)^{th}$ output 314 responsive to the first element of fourth control sequence S4 loaded to fourth selector input 341. In an exemplary embodiment, the first element of fourth control sequence S4 may be equal to 1. In an exemplary embodiment, $(j-1)^{th}$ result sequence res[j-1] may be routed to $(j,4)^{th}$ output 322 utilizing $(j,4)^{th}$ multiplexer 342. In an exemplary embodiment $(j,4)^{th}$ multiplexer 342 may route $(j-1)^{th}$ result sequence res[j-1] utilizing fourth selector input 341. In an exemplary embodiment, $(j,4)^{th}$ multiplexer 342 may route $(j-1)^{th}$ result sequence res[j-1] to $(j,4)^{th}$ output 322 responsive to the second element of fourth control sequence S4 loaded to fourth selector input 341. In an exemplary embodiment, the second element of fourth control sequence S4 may be equal to 1.

In an exemplary embodiment, $n^{th}$ adder output 348 may be updated by summing $(n,3)^{th}$ output 310, $(n,4)^{th}$ output 356, and $n^{th}$ carry input 362 equal to 0. In an exemplary embodiment, $n^{th}$ adder output 348 may be updated utilizing $n^{th}$ adder 364. In an exemplary embodiment, $n^{th}$ result sequence res[n] may be updated by storing $n^{th}$ adder output 348 in $n^{th}$ shift register 350. In an exemplary embodiment, $n^{th}$ XOR gate output 374 may be generated by performing an XOR operation on two most significant bits of $n^{th}$ shift register 350. In an exemplary embodiment, $n^{th}$ XOR gate output 374 may be generated utilizing an $n^{th}$ XOR gate 376 of a plurality of XOR gates. In an exemplary embodiment, the $n^{th}$ decrypted message bit may be extracted by routing $n^{th}$ XOR gate output 374 to $n^{th}$ parallel output 366. In an exemplary embodiment, $n^{th}$ decrypted message bit may be extracted utilizing an $(n,5)^{th}$ multiplexer 370. In an exemplary embodiment, an $(n,5)^{th}$ multiplexer 370 may route $n^{th}$ XOR gate output 374 to $n^{th}$ parallel output 366 utilizing fifth selector input 371. In an exemplary embodiment, an $(n,5)^{th}$ multiplexer 370 may route $n^{th}$ XOR gate output 374 to $n^{th}$ parallel output 366 responsive to sixth control sequence S6 loaded to fifth selector input 371. In an exemplary embodiment, sixth control sequence S6 may be equal to 1.

Figure 3C:
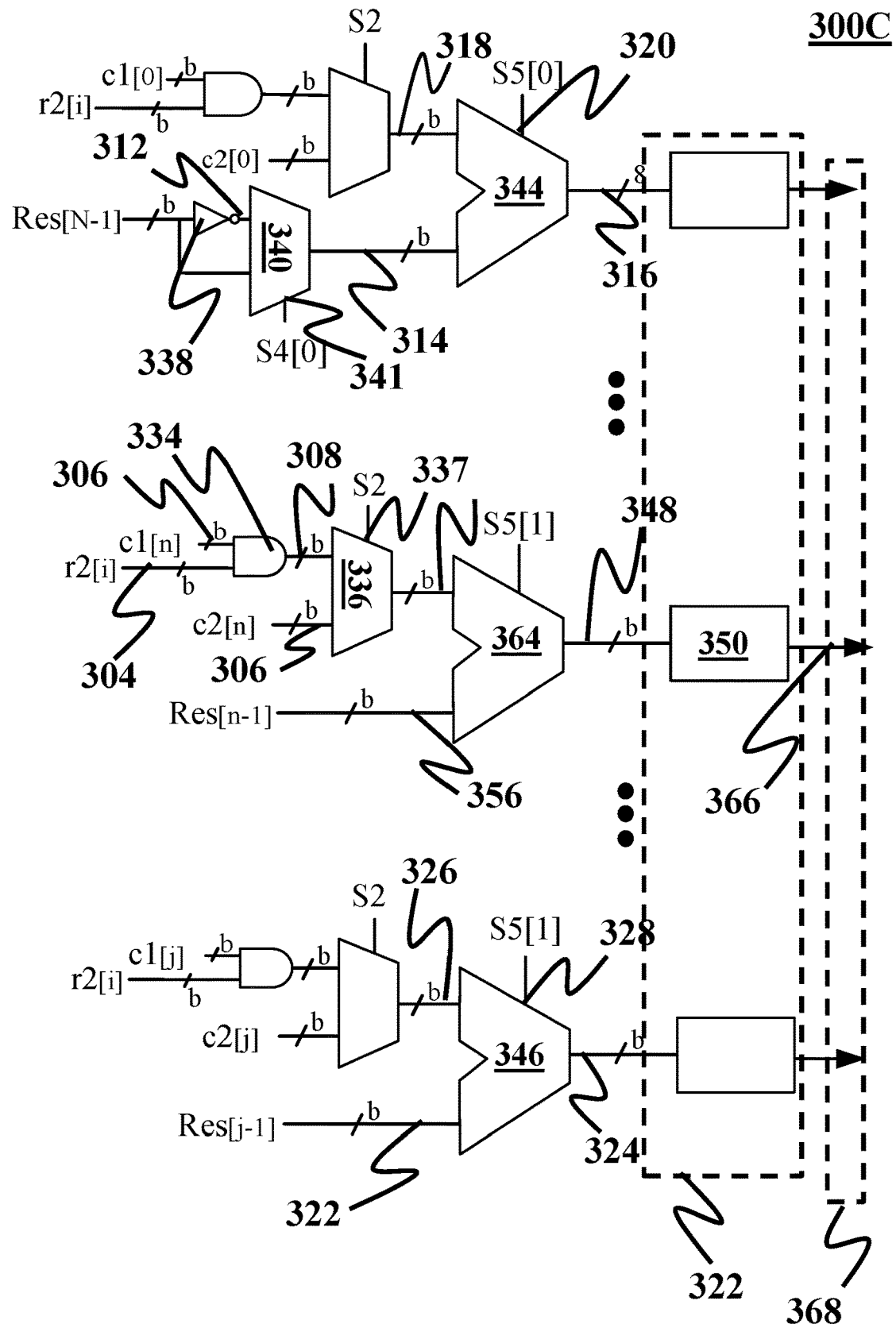
FIG. 3C shows a parallel decryption logic circuit, consistent with one or more exemplary embodiments of the present disclosure.

FIG. 3C shows a parallel decryption logic circuit, consistent with one or more exemplary embodiments of the present disclosure. In an exemplary embodiment, a parallel decryption logic circuit 300C may include a third implementation of parallel cryptoprocessing logic circuit 300. In an exemplary embodiment, different steps of method 106 may be implemented utilizing parallel decryption logic circuit 300C. In an exemplary embodiment, $i^{th}$ private sequence $r_2[i]$ may be routed to $(n,1)^{th}$ output 304 utilizing a direct connection. In other words, in an exemplary embodiment, $i^{th}$ private sequence $r_2[i]$ may be directly connected to $(n,1)^{th}$ output 304. In an exemplary embodiment, $n^{th}$ first ciphertext sequence $c_1[n]$ may be routed to $(n,2)^{th}$ output 306 utilizing a direct connection. In an exemplary embodiment, $(j-1)^{th}$ result sequence res[j-1] may be routed to $(j,4)^{th}$ output 322 utilizing a direct connection. In an exemplary embodiment, $n^{th}$ result sequence res[n] may be routed to $n^{th}$ parallel output 366 utilizing a direct connection.

Figure 1I:
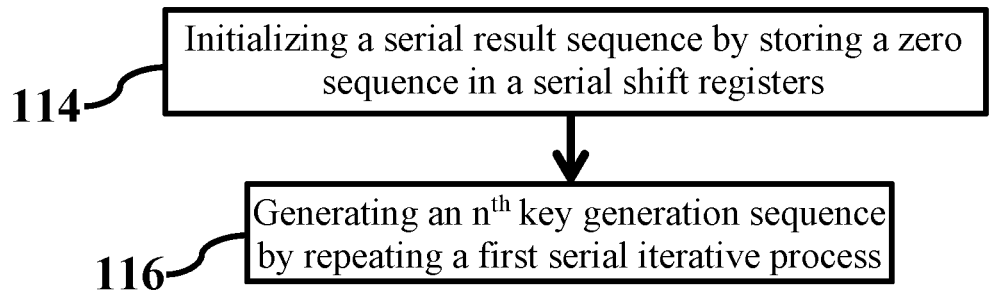
FIG. 1I shows a second flowchart of generating a key generation product, consistent with one or more exemplary embodiments of the present disclosure.
Figure 4:
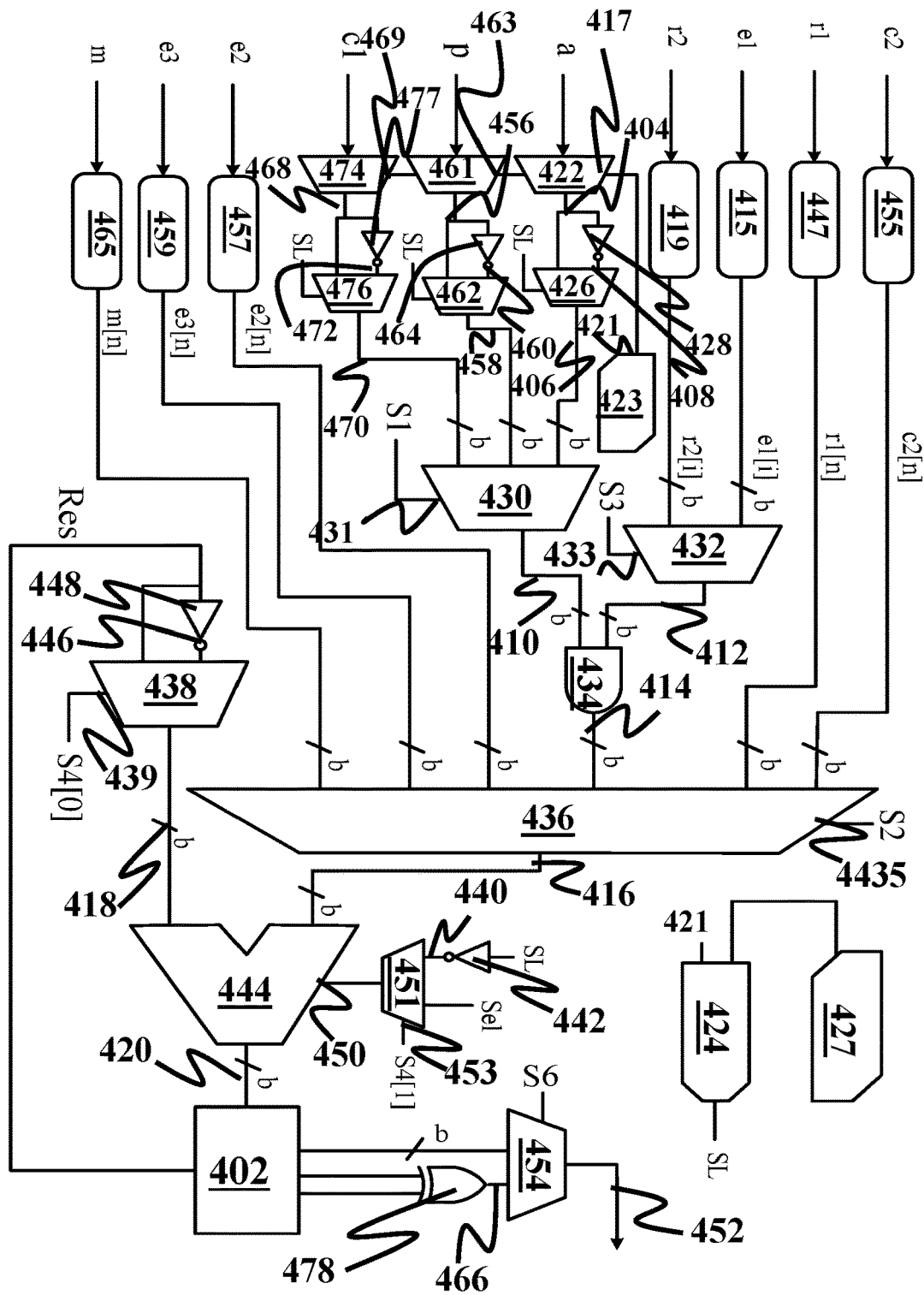
FIG. 4 shows a schematic of a serial cryptoprocessing logic circuit, consistent with one or more exemplary embodiments of the present disclosure.

In further details regarding to step 110, FIG. 1I shows a second flowchart of generating a key generation product, consistent with one or more exemplary embodiments of the present disclosure. An exemplary method 110B may include a second implementation of step 110. FIG. 4 shows a schematic of a serial cryptoprocessing logic circuit, consistent with one or more exemplary embodiments of the present disclosure. In an exemplary embodiment, different steps of method 100 may be implemented utilizing a serial cryptoprocessing logic circuit 400. In an exemplary embodiment, generating the key generation product may include initializing a serial result sequence Res (step 111) and generating the $n^{th}$ key generation sequence (step 113). In an exemplary embodiment, serial result sequence Res may be initialized by storing the zero sequence in a serial shift register 402. In an exemplary embodiment, serial shift register 402 may be associated with serial result sequence Res. In an exemplary embodiment, serial result sequence Res may be stored in serial shift register 402.

For further details with regards to step 113, in an exemplary embodiment, the $n^{th}$ key generation sequence may be generated by repeating a first serial iterative process for N times. In an exemplary embodiment, the $n^{th}$ key generation sequence may be obtained by multiplying public sequence a by private key $r_2$. An exemplary $n^{th}$ key generation sequence may be associated with serial result sequence Res. In an exemplary embodiment, serial result sequence Res may include $n^{th}$ key generation sequence when the first serial iterative process is performed. An exemplary $i^{th}$ iteration of the first iterative process, where $0 \le i \le N-1$, may include routing an $i^{th}$ public subsequence a[i] of the plurality of public subsequences to a first public output 404, generating a selector bit SL, routing first public output 404 to a second public output 406, generating a public inverter output 408 by bit-wise inverting first public output 404, routing public inverter output 408 to second public output 406, routing second public output 406 to a first serial output 410, routing $i^{th}$ private sequence $r_2[i]$ to a second serial output 412, generating a serial AND gate output 414, routing serial AND gate output 414 to a third serial output 416, routing serial result sequence Res to a fourth serial output 418, generating a serial adder output 420, updating serial result sequence Res.

In an exemplary embodiment, $i^{th}$ private sequence $r_2[i]$ may be extracted from a private key shift register 419. In an exemplary embodiment, $i^{th}$ public subsequence a[i] may be routed to first public output 404 utilizing a first public multiplexer 422. In an exemplary embodiment, first public multiplexer 422 may route $i^{th}$ public subsequence a[i] to first public output 404 utilizing a first public selector input 417. In an exemplary embodiment, first public multiplexer 422 may route $i^{th}$ public subsequence a[i] to first public output 404 responsive to a first counter output 421 loaded to first public selector input 417. In an exemplary embodiment, first counter output 421 may be equal to i. In an exemplary embodiment, first counter output 421 may be generated by first counter 423. An exemplary first counter 423 may count from 0 to N-1.

An exemplary selector bit SL may be generated utilizing a comparator 424. An exemplary comparator 424 may compare first counter output 421 and a second counter output 425. In an exemplary embodiment, second counter output 425 may be generated utilizing a second counter 427. In an exemplary embodiment, first counter output 421 may be equal to i. In an exemplary embodiment, second counter output 425 may be equal to n. An exemplary selector bit SL may be generated by setting selector bit SL to 1 responsive to n larger than or equal to i. An exemplary selector bit SL may be generated by setting selector bit SL to 0 responsive to n smaller than i. An exemplary first public output 404 may be routed to second public output 406 utilizing a second public multiplexer 426 responsive to selector bit SL equal to 1. An exemplary public inverter output 408 may be generated utilizing a public inverter 428 responsive to selector bit SL equal 0. An exemplary public inverter output 408 may be routed to second public output 406 utilizing second public multiplexer 426 responsive to selector bit SL equal to 0.

An exemplary second public output 406 may be routed to first serial output 410 utilizing a first serial multiplexer 430. In an exemplary embodiment, first serial multiplexer 430 may route second public output 406 to first serial output 410 responsive to first control sequence S1 loaded to a first serial selector input 431. In an exemplary embodiment, first control sequence S1 may be equal to 00. An exemplary $i^{th}$ private sequence $r_2[i]$ may be routed to second serial output 412 utilizing a second serial multiplexer 432. In an exemplary embodiment, second serial multiplexer 432 may route $i^{th}$ private sequence $r_2[i]$ to second serial output 412 responsive to third control sequence S3 loaded to a second serial selector input 433. In an exemplary embodiment, third control sequence S3 may be equal to 1.

An exemplary serial AND gate output 414 may be generated by performing an AND operation on first serial output 410 and second serial output 412. An exemplary serial AND gate output 414 may be generated utilizing a serial AND gate 434. An exemplary serial AND gate output 414 may be routed to third serial output 416 utilizing a third serial multiplexer 436. In an exemplary embodiment, third serial multiplexer 436 may route serial AND gate output 414 to third serial output 416 responsive to second control sequence S2 loaded to a third serial selector input 435. In an exemplary embodiment, second control sequence S2 may be equal to 010. An exemplary serial result sequence Res may be routed to fourth serial output 418 utilizing a fourth serial multiplexer 438. In an exemplary embodiment, fourth serial multiplexer 438 may route serial result sequence Res to fourth serial output 418 responsive to the first element of fourth control sequence S4 loaded to fourth serial selector input 439. In an exemplary embodiment, the first element of fourth control sequence S4 may be equal to 1.

An exemplary serial adder output 420 may be generated by generating a selector inverter output 440 and obtaining serial adder output 420. An exemplary selector inverter output 440 may be generated by inverting selector bit SL utilizing a selector inverter 442. An exemplary serial adder output 420 may be obtained by summing third serial output 416, fourth serial output 418, and selector inverter output 440 utilizing a serial adder 444. An exemplary serial adder output 420 may be updated by storing serial adder output 420 in serial shift register 402.

Figure 1J:
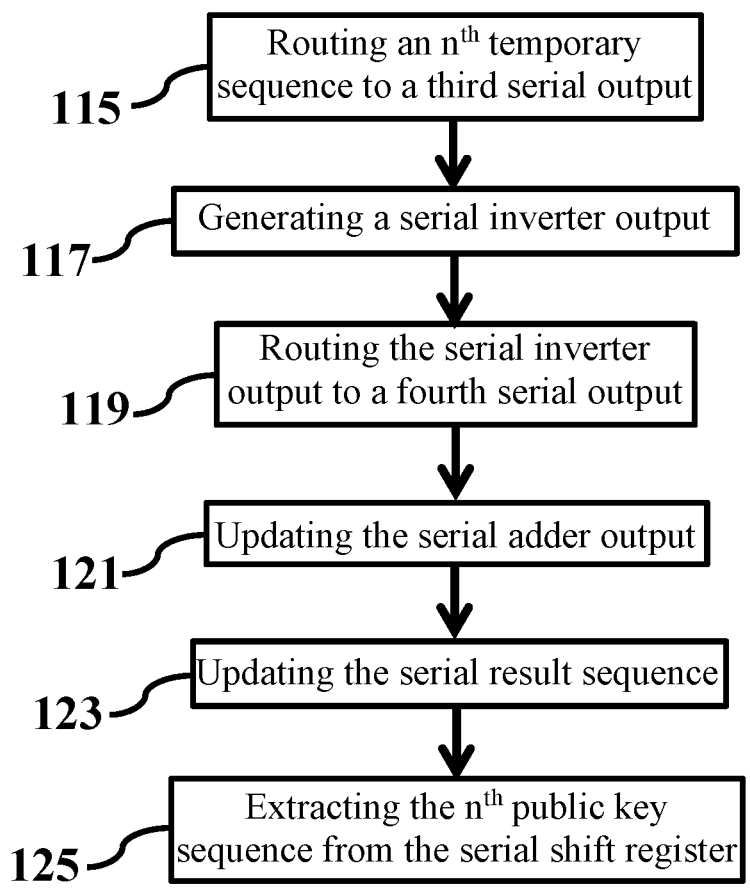
FIG. 1J shows a second flowchart of obtaining a public key sequence, consistent with one or more exemplary embodiments of the present disclosure.

For further detail with regards to step 112, FIG. 1J shows a second flowchart of obtaining a public key sequence, consistent with one or more exemplary embodiments of the present disclosure. An exemplary method 112B may include a second implementation of step 112. In an exemplary embodiment, different steps of method 112B may be implemented utilizing serial cryptoprocessing logic circuit 400. In an exemplary embodiment, obtaining public key p may include obtaining $n^{th}$ public key sequence p[n]. In an exemplary embodiment, obtaining $n^{th}$ public key sequence p[n] may include routing $n^{th}$ temporary sequence $r_1$[n] to third serial output 416 (step 115), generating a serial inverter output 446 (step 117), routing serial inverter output 446 to fourth serial output 418 (step 119), updating serial adder output 420 (step 121), updating the serial result sequence Res (step 123), and extracting $n^{th}$ public key sequence p[n] from serial shift register 402 (step 125).

An exemplary $n^{th}$ temporary sequence $r_1$[n] may be extracted from a temporary key shift register 447. An exemplary $n^{th}$ temporary sequence $r_1$[n] may be routed to third serial output 416 utilizing third serial multiplexer 436. In an exemplary embodiment, third serial multiplexer 436 may route $n^{th}$ temporary sequence $r_1$[n] to third serial output 416 responsive to second control sequence S2 loaded to third serial selector input 435. In an exemplary embodiment, second control sequence S2 may be equal to 001. An exemplary serial inverter output 446 may be generated by bit-wise inverting serial result sequence Res. An exemplary serial inverter output 446 may be generated utilizing a serial inverter 448. An exemplary serial inverter output 446 may be routed to fourth serial output 418 utilizing fourth serial multiplexer 438. In an exemplary embodiment, fourth serial multiplexer 438 may route selector inverter output 440 to fourth serial output 418 responsive to the first element of fourth control sequence S4 loaded to fourth serial selector input 439. In an exemplary embodiment, the first element of fourth control sequence S4 may be equal to 0. An exemplary serial adder output 420 may be updated by summing third serial output 416, fourth serial output 418, and a serial carry input 450 equal to 1.

In an exemplary embodiment, a fifth serial multiplexer 451 may route one of selector inverter output 440 and a selector control bit Sel to serial carry input 450 responsive to a second element of fourth control sequence S4 loaded to fifth serial selector input 453. In an exemplary embodiment, fifth serial multiplexer 451 may route selector inverter output 440 to serial carry input 450 responsive to the second element of fourth control sequence S4 equal to 0. In an exemplary embodiment, fifth serial multiplexer 451 may route selector control bit Sel to serial carry input 450 responsive to the second element of fourth control sequence S4 equal to 1.

An exemplary serial adder output 420 may be updated utilizing serial adder 444. An exemplary serial result sequence Res may be updated by storing serial adder output 420 in serial shift register 402. An exemplary $n^{th}$ public key sequence p[n] may be extracted from serial shift register 402 by routing serial result sequence Res to a serial output 452. An exemplary $n^{th}$ public key sequence p[n] may be extracted from serial shift register 402 utilizing a sixth serial multiplexer 454.

Figure 4A:
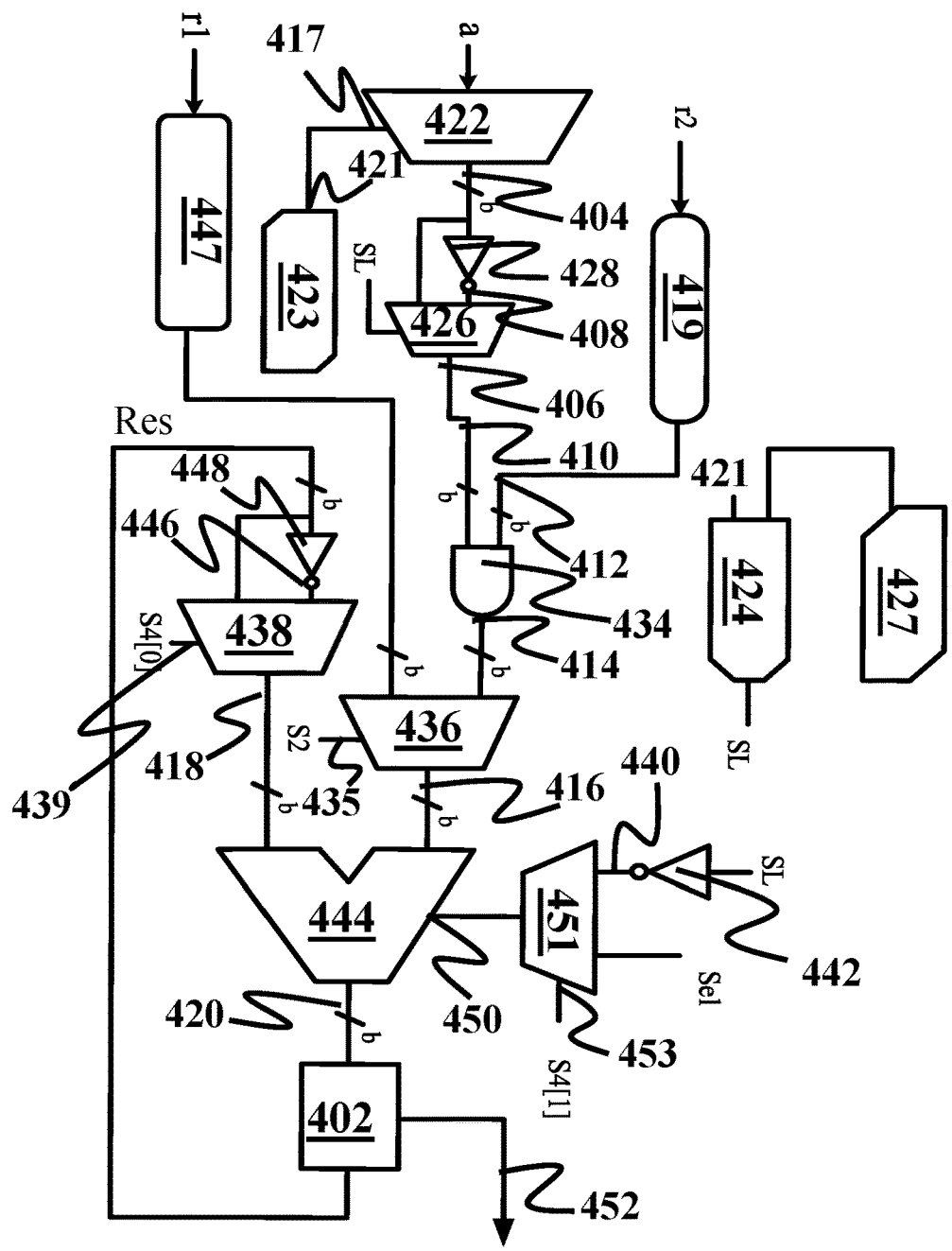
FIG. 4A shows a serial key generation logic circuit, consistent with one or more exemplary embodiments of the present disclosure.

FIG. 4A shows a serial key generation logic circuit, consistent with one or more exemplary embodiments of the present disclosure. In an exemplary embodiment, a serial key generation logic circuit 400A may include a first implementation of serial cryptoprocessing logic circuit 400. In an exemplary embodiment, parallel key generation logic circuit 300A may simultaneously obtain the plurality of public key sequences. On the other hand, in an exemplary embodiment, serial key generation logic circuit 400A may obtain each of the plurality of public key sequences one at a time. In an exemplary embodiment, different steps of method 102 may be implemented utilizing serial key generation logic circuit 400A. An exemplary second public output 406 may be routed to first serial output 410 utilizing a direct connection. In other words, in an exemplary embodiment, second public output 406 may be directly connected to first serial output 410. An exemplary $i^{th}$ private sequence $r_2$[i] may be routed to second serial output 412 utilizing a direct connection. An exemplary $n^{th}$ public key sequence p[n] may be extracted from serial shift register 402 utilizing a direct connection.

Figure 1K:
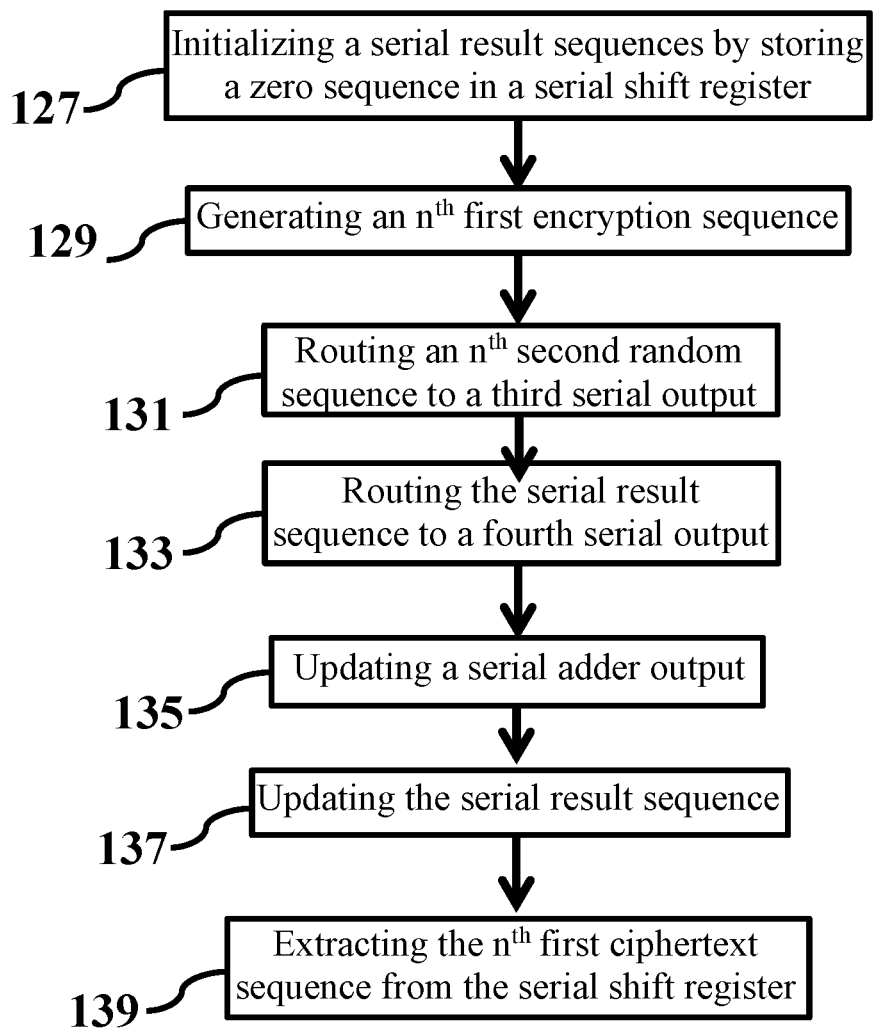
FIG. 1K shows a second flowchart of generating a first ciphertext sequence, consistent with one or more exemplary embodiments of the present disclosure.

In further detail with regards to step 134, FIG. 1K shows a second flowchart of generating a first ciphertext sequence, consistent with one or more exemplary embodiments of the present disclosure. An exemplary method 134B may include a second implementation of step 134. Referring to FIGS. 1K and 3, in an exemplary embodiment, generating $n^{th}$ first ciphertext sequence $c_1$[n] may include initializing serial result sequence Res (step 127), generating the $n^{th}$ first encryption sequence (step 129), routing $n^{th}$ second random sequence $e_2$[n] to third serial output 416 (step 131), routing serial result sequence Res to fourth serial output 418 (step 133), updating serial adder output 420 (step 135), updating serial result sequence Res (step 137), and extracting $n^{th}$ first ciphertext sequence $c_1$[n] from serial shift register 402 (step 139). In an exemplary embodiment, $n^{th}$ second random sequence $e_2$[n] may be extracted from a second random key shift register 457. In an exemplary embodiment, serial result sequence Res may be initialized by storing the zero sequence in a serial shift register 402. In an exemplary embodiment, serial shift register 402 may be associated with serial result sequence Res. In an exemplary embodiment, serial result sequence Res may be stored in serial shift register 402.

For further detail with regards to step 129, in an exemplary embodiment, the $n^{th}$ first encryption sequence may be generated by repeating a second serial iterative process for N times. In an exemplary embodiment, the $n^{th}$ first encryption sequence may be obtained by multiplying public sequence a by first random key $e_1$, i.e., first encryption product $ae_1$. An exemplary first encryption product $ae_1$ may include the plurality of first encryption sequences. An exemplary $n^{th}$ first encryption sequence may be associated with serial result sequence Res. In an exemplary embodiment, serial result sequence Res may include $n^{th}$ first encryption sequence when the second serial iterative process is performed. An exemplary $i^{th}$ iteration of the second iterative process may include routing $i^{th}$ public subsequence a[i] to first public output 404, generating selector bit SL, routing first public output 404 to second public output 406, generating public inverter output 408 by bit-wise inverting first public output 404, routing public inverter output 408 to second public output 406, routing second public output 406 to first serial output 410, routing $i^{th}$ first random sequence $e_1$[i] to second serial output 412, updating serial AND gate output 414, routing serial AND gate output 414 to third serial output 416, routing serial result sequence Res to fourth serial output 418, updating serial adder output 420, updating serial result sequence Res.

In an exemplary embodiment, $i^{th}$ first random sequence $e_1$[i] may be extracted from a first random key shift register 415. In an exemplary embodiment, $i^{th}$ public subsequence a[i] may be routed to first public output 404 utilizing first public multiplexer 422. In an exemplary embodiment, first public multiplexer 422 may route $i^{th}$ public subsequence a[i] to first public output 404 utilizing a first public selector input 417. In an exemplary embodiment, first public multiplexer 422 may route $i^{th}$ public subsequence a[i] to first public output 404 responsive to first counter output 421 loaded to first public selector input 417. In an exemplary embodiment, first counter output 421 may be equal to i. An exemplary selector bit SL may be generated utilizing comparator 424. An exemplary selector bit SL may be generated by setting selector bit SL to 1 responsive to n larger than or equal to i. An exemplary selector bit SL may be generated by setting selector bit SL to 0 responsive to n smaller than i. An exemplary first public output 404 may be routed to second public output 406 utilizing second public multiplexer 426 responsive to selector bit SL equal to 1. An exemplary public inverter output 408 may be generated utilizing a public inverter 428 responsive to selector bit SL equal 0.

An exemplary public inverter output 408 may be routed to second public output 406 utilizing second public multiplexer 426 responsive to selector bit SL equal to 0. An exemplary second public output 406 may be routed to first serial output 410 utilizing first serial multiplexer 430. In an exemplary embodiment, first serial multiplexer 430 may route second public output 406 to first serial output 410 responsive to first control sequence S1 loaded to first serial selector input 431. In an exemplary embodiment, first control sequence S1 may be equal to 00. An exemplary $i^{th}$ first random sequence $e_1[i]$ may be routed to second serial output 412 utilizing second serial multiplexer 432. In an exemplary embodiment, second serial multiplexer 432 may route $i^{th}$ first random sequence $e_1[i]$ to second serial output 412 responsive to third control sequence S3 loaded to a second serial selector input 433. In an exemplary embodiment, third control sequence S3 may be equal to 0.

An exemplary serial AND gate output 414 may be generated by performing an AND operation on first serial output 410 and second serial output 412. An exemplary serial AND gate output 414 may be generated utilizing serial AND gate 434. An exemplary serial AND gate output 414 may be routed to third serial output 416 utilizing third serial multiplexer 436. In an exemplary embodiment, third serial multiplexer 436 may route serial AND gate output 414 to third serial output 416 responsive to second control sequence S2 loaded to third serial selector input 435. In an exemplary embodiment, second control sequence S2 may be equal to 010.

An exemplary serial result sequence Res may be routed to fourth serial output 418 utilizing fourth serial multiplexer 438. In an exemplary embodiment, fourth serial multiplexer 438 may route serial result sequence Res to fourth serial output 418 responsive to the first element of fourth control sequence S4 loaded to fourth serial selector input 439. In an exemplary embodiment, the first element of fourth control sequence S4 may be equal to 1. An exemplary serial adder output 420 may be updated by updating selector inverter output 440 and obtaining serial adder output 420. An exemplary selector inverter output 440 may be updated by inverting selector bit SL utilizing selector inverter 442. An exemplary serial adder output 420 may be obtained by summing third serial output 416, fourth serial output 418, and selector inverter output 440 utilizing serial adder 444. An exemplary serial adder output 420 may be updated by storing serial adder output 420 in serial shift register 402.

In an exemplary embodiment, first ciphertext $c_1$ may be obtained by summing first encryption product $ae_1$ and second random key $e_2$. In an exemplary embodiment, steps 131-137 of method 134B may be performed to generate first ciphertext $c_1$ by summing first encryption product $ae_1$ and second random key $e_2$. An exemplary $n^{th}$ second random $e_2[n]$ may be routed to third serial output 416 utilizing third serial multiplexer 436. In an exemplary embodiment, third serial multiplexer 436 may route $n^{th}$ second random $e_2[n]$ to third serial output 416 responsive to second control sequence S2 loaded to third serial selector input 435. In an exemplary embodiment, second control sequence S2 may be equal to 011. An exemplary serial result sequence Res may be routed to fourth serial output 418 utilizing fourth serial multiplexer 438. In an exemplary embodiment, fourth serial multiplexer 438 may route serial result sequence Res to fourth serial output 418 responsive to the first element of fourth control sequence S4 loaded to fourth serial selector input 439. In an exemplary embodiment, the first element of fourth control sequence S4 may be equal to 1. An exemplary serial adder output 420 may be updated by summing third serial output 416, fourth serial output 418, and serial carry input 450 equal to 0.

An exemplary serial adder output 420 may be updated utilizing serial adder 444. An exemplary serial result sequence Res may be updated by storing serial adder output 420 in serial shift register 402. An exemplary $n^{th}$ first ciphertext sequence $c_1[n]$ may be extracted by routing serial result sequence Res to serial output 452. An exemplary $n^{th}$ first ciphertext sequence $c_1[n]$ may be extracted utilizing sixth serial multiplexer 454.

Figure 1L:
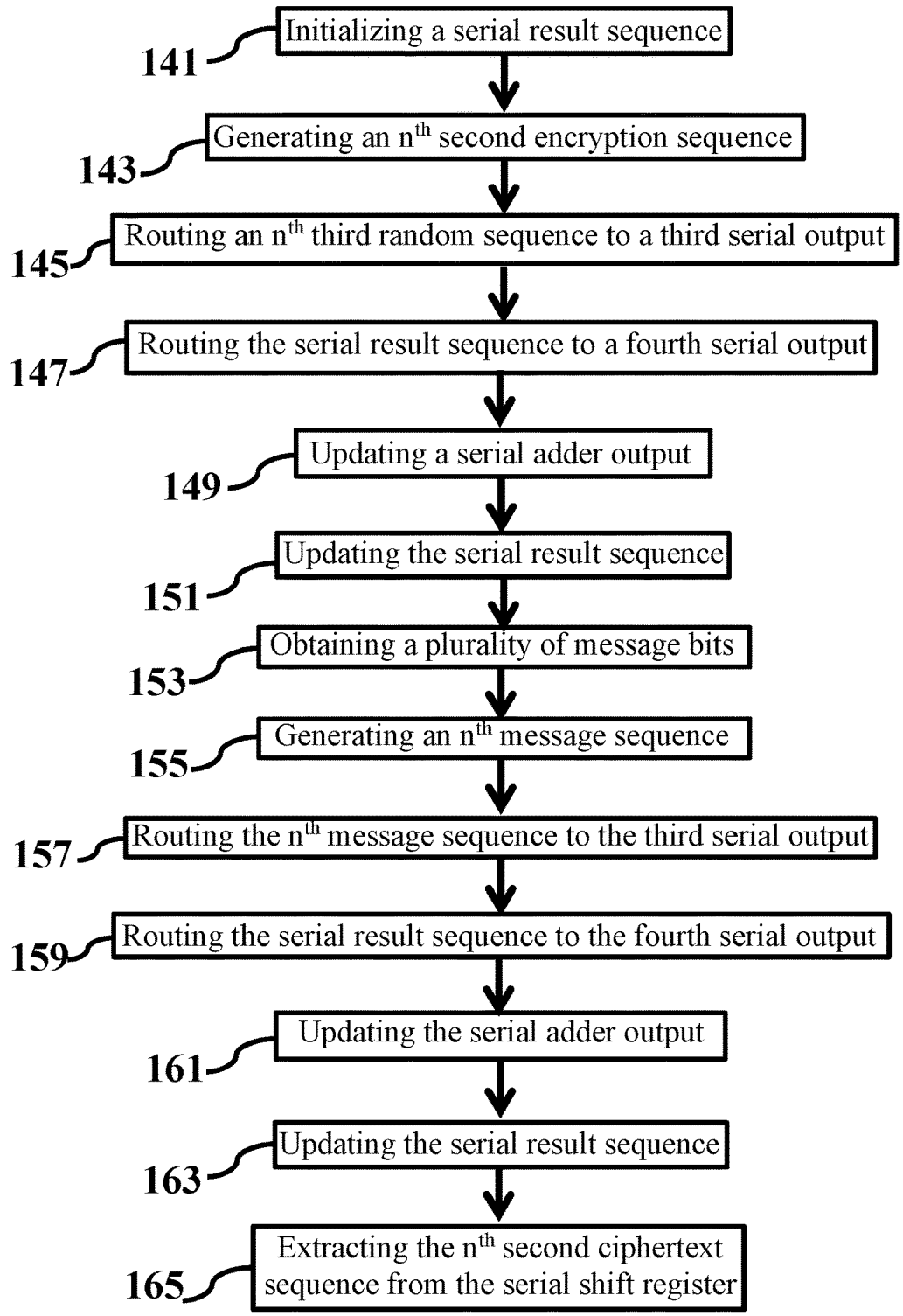
FIG. 1L shows a second flowchart of generating a second ciphertext sequence, consistent with one or more exemplary embodiments of the present disclosure.

For further detail with respect to step 136, FIG. 1L shows a second flowchart of generating a second ciphertext sequence, consistent with one or more exemplary embodiments of the present disclosure. An exemplary method 136B may include a second implementation of step 136. Referring to FIGS. 1L and 4, in an exemplary embodiment, generating $n^{th}$ second ciphertext sequence $c_2[n]$ may include initializing serial result sequence Res (step 141), generating an $n^{th}$ second encryption sequence (step 143), routing $n^{th}$ third random sequence $e_3[n]$ to third serial output 416 (step 145), routing serial result sequence Res to fourth serial output 418 (step 147), updating serial adder output 420 (step 149), updating serial result sequence Res (step 151), obtaining a plurality of message bits (step 153), generating an $n^{th}$ message sequence (step 155), routing the $n^{th}$ message sequence to third serial output 416 (step 157), routing serial result sequence Res to fourth serial output 418 (step 159), updating serial adder output 420 (step 161), updating serial result sequence Res (step 163), and extracting $n^{th}$ second ciphertext sequence $c_2[n]$ from serial shift register 402 (step 139).

In an exemplary embodiment, $n^{th}$ third random sequence $e_3[n]$ may be extracted from a third random key shift register 459. In an exemplary embodiment, $n^{th}$ second ciphertext sequence $c_2[n]$ may be extracted from a ciphertext shift register 455. In an exemplary embodiment, $n^{th}$ message sequence m[n] may be extracted from a message shift register 465. In an exemplary embodiment, serial result sequence Res may be initialized by storing the zero sequence in serial shift register 402. In an exemplary embodiment, serial shift register 402 may be associated with serial result sequence Res. In an exemplary embodiment, serial result sequence Res may be stored in serial shift register 402.

An exemplary $n^{th}$ second encryption sequence may be associated with serial result sequence Res. In an exemplary embodiment, the plurality of second encryption sequences may include a multiplication result of public key sequence p and first random key $e_1$, i.e., a second encryption product $pe_1$. An exemplary second encryption product may include the plurality of second encryption sequences. As a result, serial result sequence Res may include the $n^{th}$ second encryption sequence after performing step 143.

In further details regarding to step 143, in an exemplary embodiment, the $n^{th}$ second encryption sequence may be generated by repeating a third serial iterative process for N times. An exemplary first encryption product $ae_1$ may include the plurality of first encryption sequences. An exemplary $n^{th}$ second encryption sequence may be associated with serial result sequence Res. An exemplary $i^{th}$ iteration of the third serial iterative process may include routing $i^{th}$ public key sequence p[i] to a first public key output 456, generating selector bit SL, routing first public key output 456 to a second public key output 458, generating a public key inverter output 460 by bit-wise inverting first public key output 456, routing public key inverter output 460 to second public key output 458, routing second public key output 458 to first serial output 410, routing $i^{th}$ first random sequence $e_1[i]$ to second serial output 412, updating serial AND gate output 414, routing serial AND gate output 414 to third serial output 416, routing serial result sequence Res to fourth serial output 418, updating serial adder output 420, updating serial result sequence Res.

In an exemplary embodiment, $i^{th}$ public key sequence p[i] may be routed to first public key output 456 utilizing a first public key multiplexer 461. In an exemplary embodiment, first public key multiplexer 461 may route $i^{th}$ public key sequence p[i] to first public key output 456 utilizing a first public key selector input 463. In an exemplary embodiment, first public key multiplexer 461 may route $i^{th}$ public key sequence p[i] to first public key output 456 responsive to first counter output 421 loaded to first public key selector input 463. In an exemplary embodiment, first counter output 421 may be equal to i.

An exemplary selector bit SL may be generated utilizing comparator 424. An exemplary selector bit SL may be generated by setting selector bit SL to 1 responsive to n larger than or equal to i. An exemplary selector bit SL may be generated by setting selector bit SL to 0 responsive to n smaller than i. An exemplary first public key output 456 may be routed to second public key output 458 utilizing a second public key multiplexer 462 responsive to selector bit SL equal to 1. An exemplary public key inverter output 460 may be generated utilizing a public key inverter 464 responsive to selector bit SL equal 0. An exemplary public key inverter output 460 may be routed to second public key output 458 utilizing second public key multiplexer 462 responsive to selector bit SL equal to 0. An exemplary second public key output 458 may be routed to first serial output 410 utilizing first serial multiplexer 430. In an exemplary embodiment, first serial multiplexer 430 may route second public key output 458 to first serial output 410 responsive to first control sequence S1 loaded to first serial selector input 431. In an exemplary embodiment, first control sequence S1 may be equal to 01.

An exemplary $i^{th}$ first random sequence $e_1[i]$ may be routed to second serial output 412 utilizing second serial multiplexer 432. In an exemplary embodiment, second serial multiplexer 432 may route $i^{th}$ first random sequence $e_1[i]$ to second serial output 412 responsive to third control sequence S3 loaded to a second serial selector input 433. In an exemplary embodiment, third control sequence S3 may be equal to 0. An exemplary serial AND gate output 414 may be generated by performing an AND operation on first serial output 410 and second serial output 412. An exemplary serial AND gate output 414 may be generated utilizing serial AND gate 434. An exemplary serial AND gate output 414 may be routed to third serial output 416 utilizing third serial multiplexer 436. In an exemplary embodiment, third serial multiplexer 436 may route serial AND gate output 414 to third serial output 416 responsive to second control sequence S2 loaded to third serial selector input 435. In an exemplary embodiment, second control sequence S2 may be equal to 010.

An exemplary serial result sequence Res may be routed to fourth serial output 418 utilizing fourth serial multiplexer 438. In an exemplary embodiment, fourth serial multiplexer 438 may route serial result sequence Res to fourth serial output 418 responsive to the first element of fourth control sequence S4 loaded to fourth serial selector input 439. In an exemplary embodiment, the first element of fourth control sequence S4 may be equal to 1. An exemplary serial adder output 420 may be updated by updating selector inverter output 440 and obtaining serial adder output 420. An exemplary selector inverter output 440 may be updated by inverting selector bit SL utilizing selector inverter 442. An exemplary serial adder output 420 may be obtained by summing third serial output 416, fourth serial output 418, and selector inverter output 440 utilizing serial adder 444. An exemplary serial adder output 420 may be updated by storing serial adder output 420 in serial shift register 402.

In an exemplary embodiment, second ciphertext $c_2$ may be obtained by summing second encryption product $pe_1$ and third random key $e_3$. In an exemplary embodiment, steps 145-151 of method 136B may be performed to generate second ciphertext $c_1$ by summing second encryption product $pe_1$ and third random key $e_3$. An exemplary $n^{th}$ third random sequence $e_3[n]$ may be routed to third serial output 416 utilizing third serial multiplexer 436. In an exemplary embodiment, third serial multiplexer 436 may route $n^{th}$ third random sequence $e_3[n]$ to third serial output 416 responsive to second control sequence S2 loaded to third serial selector input 435. In an exemplary embodiment, second control sequence S2 may be equal to 100.

An exemplary serial result sequence Res may be routed to fourth serial output 418 utilizing fourth serial multiplexer 438. In an exemplary embodiment, fourth serial multiplexer 438 may route serial result sequence Res to fourth serial output 418 responsive to the first element of fourth control sequence S4 loaded to fourth serial selector input 439. In an exemplary embodiment, the first element of fourth control sequence S4 may be equal to 1. An exemplary serial adder output 420 may be updated by summing third serial output 416, fourth serial output 418, and serial carry input 450 equal to 0. An exemplary serial adder output 420 may be updated utilizing serial adder 444. An exemplary serial result sequence Res may be updated by storing serial adder output 420 in serial shift register 402.

In an exemplary embodiment, $n^{th}$ second ciphertext $c_1[n]$ may be obtained by summing serial result sequence Res and $n^{th}$ message sequence m[n]. In an exemplary embodiment, steps 157-163 of method 136B may be performed to generate $c_2[n]$ by summing serial result sequence Res and $n^{th}$ message sequence m[n]. In an exemplary embodiment, the plurality of message bits may be obtained utilizing the processor. In an exemplary embodiment, $n^{th}$ message sequence m[n] may be generated by the processor. In an exemplary embodiment, $n^{th}$ message sequence m[n] may include the b bits. In an exemplary embodiment, generating $n^{th}$ message sequence m[n] may include setting $n^{th}$ message sequence m[n] to a binary value of a decimal number equal to $-\lfloor \frac{q}{2} \rfloor$ responsive to an $n^{th}$ message bit of the plurality of message bits equal to 1. In an exemplary embodiment, generating $n^{th}$ message sequence m[n] may further include setting $n^{th}$ message sequence m[n] to the zero sequence responsive to the $n^{th}$ message bit equal to 0. An exemplary $n^{th}$ message sequence m[n] may be routed to third serial output 416 utilizing third serial multiplexer 436. In an exemplary embodiment, third serial multiplexer 436 may route $n^{th}$ message sequence m[n] to third serial output 416 responsive to second control sequence S2 loaded to third serial selector input 435. In an exemplary embodiment, second control sequence S2 may be equal to 101.

An exemplary serial result sequence Res may be routed to fourth serial output 418 utilizing fourth serial multiplexer 438. In an exemplary embodiment, fourth serial multiplexer 438 may route serial result sequence Res to fourth serial output 418 responsive to the first element of fourth control sequence S4 loaded to fourth serial selector input 439. In an exemplary embodiment, the first element of fourth control sequence S4 may be equal to 1. An exemplary serial adder output 420 may be updated by summing third serial output 416, fourth serial output 418, and serial carry input 450 equal to 0. An exemplary serial adder output 420 may be updated utilizing serial adder 444. An exemplary serial result sequence Res may be updated by storing serial adder output 420 in serial shift register 402. An exemplary $n^{th}$ second ciphertext $c_2[n]$ may be extracted by routing serial result sequence Res to serial output 452. An exemplary $n^{th}$ second ciphertext Q[n] may be extracted utilizing sixth serial multiplexer 454.

Figure 4B:
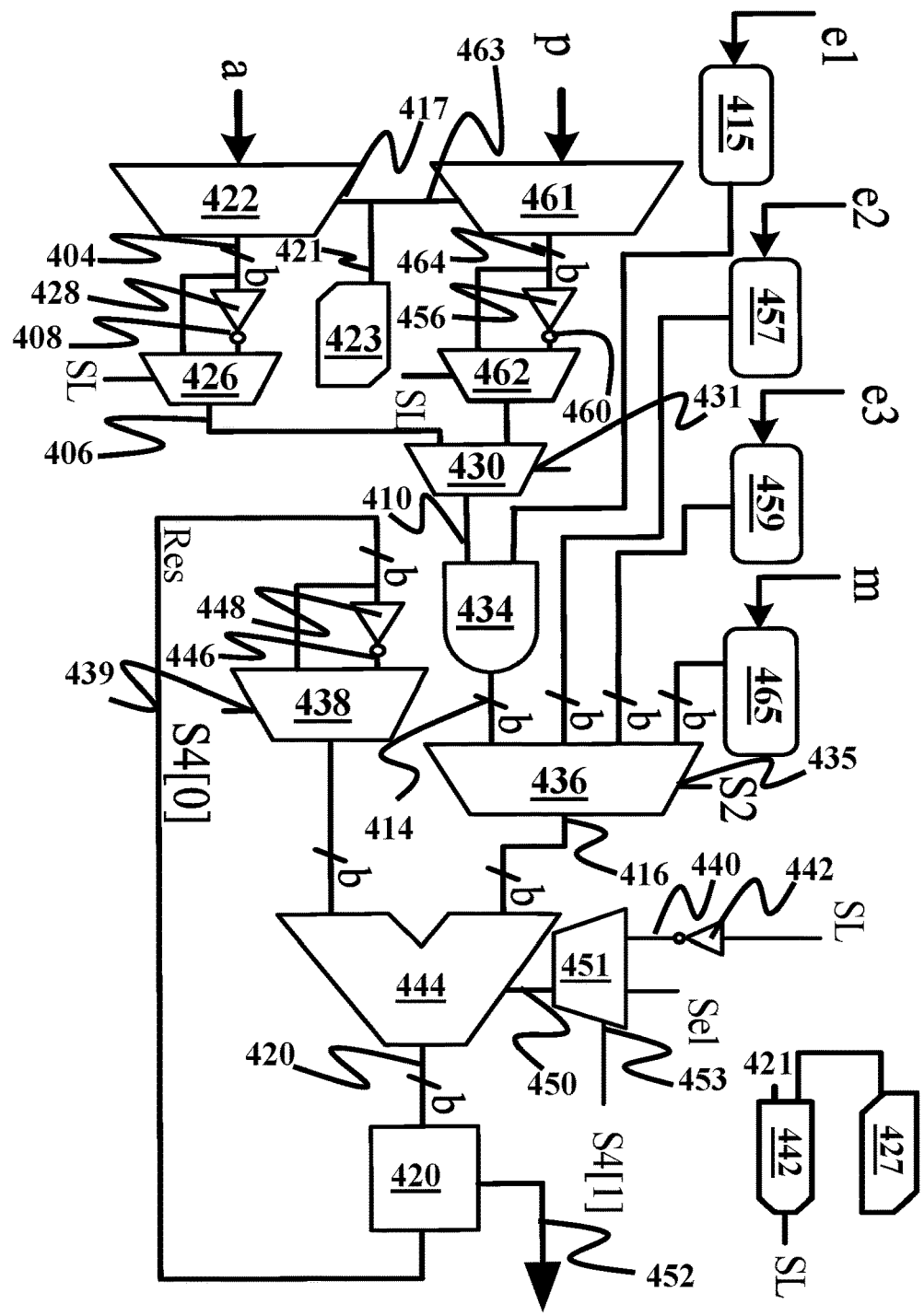
FIG. 4B shows a serial encryption logic circuit, consistent with one or more exemplary embodiments of the present disclosure.

FIG. 4B shows a serial encryption logic circuit, consistent with one or more exemplary embodiments of the present disclosure. In an exemplary embodiment, a serial encryption logic circuit 400B may include a second implementation of serial cryptoprocessing logic circuit 400. In an exemplary embodiment, parallel encryption logic circuit 300B may simultaneously obtain the plurality of first ciphertext sequences. On the other hand, in an exemplary embodiment, serial encryption logic circuit 400B may obtain each of the plurality of first ciphertext sequences one at a time. In an exemplary embodiment, parallel encryption logic circuit 300B may simultaneously obtain the plurality of second ciphertext sequences. On the other hand, serial encryption logic circuit 400B may obtain each of the plurality of second ciphertext sequences one at a time. In an exemplary embodiment, different steps of method 104 may be implemented utilizing serial encryption logic circuit 400B. An exemplary $i^{th}$ first random sequence $e_1[i]$ may be routed to second serial output 412 utilizing a direct connection. In other words, in an exemplary embodiments, $i^{th}$ first random sequence $e_1[i]$ may be directly connected to second serial output 412. An exemplary $n^{th}$ first ciphertext sequence $c_1[n]$ may be extracted utilizing a direct connection. An exemplary $n^{th}$ second ciphertext sequence $c_2[n]$ may be extracted utilizing a direct connection.

Figure 1M:
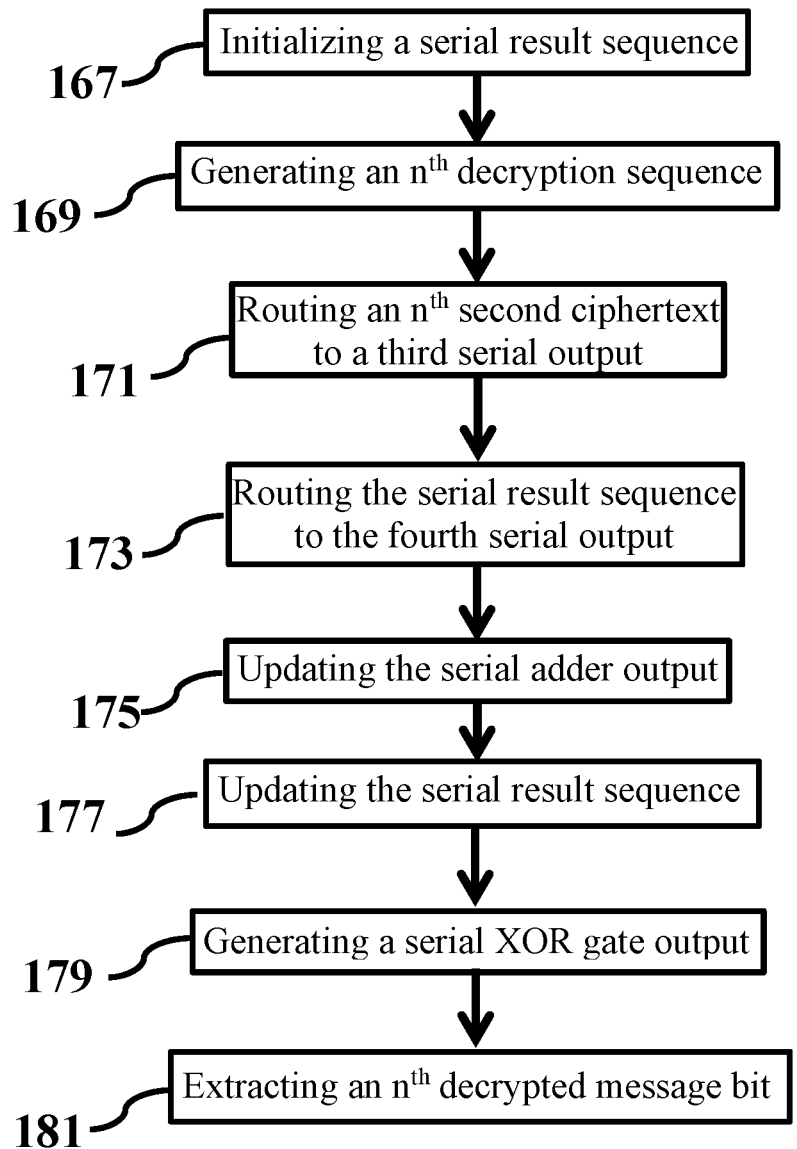
FIG. 1M shows a second flowchart of generating a plurality of decrypted message bits, consistent with one or more exemplary embodiments of the present disclosure.

In further detail with respect to step 106, FIG. 1M shows a second flowchart of generating a plurality of decrypted message bits, consistent with one or more exemplary embodiments of the present disclosure. An exemplary method 106B may include a second implementation of step 106. Referring to FIGS. 1M and 4, in an exemplary embodiment, generating a plurality of decrypted message bits may include initializing serial result sequence Res (step 167), generating an $n^{th}$ decryption sequence (step 169), routing $n^{th}$ second ciphertext sequence $c_2[n]$ to third serial output 416 (step 171), routing serial result sequence Res to fourth serial output 418 (step 173), updating serial adder output 420 (step 175), updating serial result sequence Res (step 177), generating a serial XOR gate output 466 (step 179), and extracting the $n^{th}$ decrypted message bit from serial XOR gate output 466 (step 181).

In an exemplary embodiment, serial result sequence Res may be initialized by storing the zero sequence serial shift register 402. An exemplary $n^{th}$ decryption sequence may be associated with serial result sequence Res. In an exemplary embodiment, the plurality of decryption sequences may include a multiplication result of first ciphertext $c_1$ and private key $r_2$, i.e., a decryption product $c_1 r_2$. An exemplary decryption product $c_1 r_2$ may include the plurality of decryption sequences. As a result, serial result sequence Res may include the $n^{th}$ decryption sequence after performing step 169.

In further detail regarding to step 169, in an exemplary embodiment, the $n^{th}$ decryption sequence may be generated by repeating a fourth serial iterative process for N times. An exemplary decryption product $c_1 r_2$ may include the plurality of decryption sequences. An exemplary $n^{th}$ decryption sequence may be associated with serial result sequence Res. An exemplary $i^{th}$ iteration of the fourth iterative process may include routing an $i^{th}$ first ciphertext sequence $c_1[i]$ of a plurality of first ciphertext sequences to a first ciphertext output 468, updating selector bit SL, routing first ciphertext output 468 to a second ciphertext output 470, generating a ciphertext inverter output 472 by bit-wise inverting first ciphertext output 468, routing ciphertext inverter output 472 to second ciphertext output 470, routing second ciphertext output 470 to first serial output 410, routing $i^{th}$ private sequence $r_2[i]$ to second serial output 412, updating serial AND gate output 414, routing serial AND gate output 414 to third serial output 416, routing serial result sequence Res to fourth serial output 418, updating serial adder output 420, updating serial result sequence Res.

In an exemplary embodiment, $i^{th}$ first ciphertext sequence $c_1[i]$ may be routed to first ciphertext output 468 utilizing a first ciphertext multiplexer 474. In an exemplary embodiment, first ciphertext multiplexer 474 may route $i^{th}$ first ciphertext sequence $c_1[i]$ to first ciphertext output 468 utilizing a first ciphertext selector input 469. In an exemplary embodiment, first ciphertext multiplexer 474 may route $i^{th}$ first ciphertext sequence $c_1[i]$ to first ciphertext output 468 responsive to first counter output 421 loaded to first ciphertext selector input 469. In an exemplary embodiment, first counter output 421 may be equal to i. An exemplary selector bit SL may be generated utilizing comparator 424. An exemplary selector bit SL may be generated by setting selector bit SL to 1 responsive to n larger than or equal to i. An exemplary selector bit SL may be generated by setting selector bit SL to 0 responsive to n smaller than i. An exemplary first ciphertext output 468 may be routed to second ciphertext output 470 utilizing a second ciphertext multiplexer 476 responsive to selector bit SL equal to 1. An exemplary ciphertext inverter output 472 may be generated utilizing a ciphertext inverter 477 responsive to selector bit SL equal 0.

An exemplary ciphertext inverter output 472 may be routed to second ciphertext output 470 utilizing second ciphertext multiplexer 476 responsive to selector bit SL equal to 0. An exemplary second ciphertext output 470 may be routed to first serial output 410 utilizing first serial multiplexer 430. In an exemplary embodiment, first serial multiplexer 430 may route second ciphertext output 470 to first serial output 410 responsive to first control sequence S1 loaded to first serial selector input 431. In an exemplary embodiment, first control sequence S1 may be equal to 10. An exemplary $i^{th}$ private sequence $r_2[i]$ may be routed to second serial output 412 utilizing second serial multiplexer 432. In an exemplary embodiment, second serial multiplexer 432 may route $i^{th}$ private sequence $r_2[i]$ to second serial output 412 responsive to third control sequence S3 loaded to a second serial selector input 433. In an exemplary embodiment, third control sequence S3 may be equal to 1.

An exemplary serial AND gate output 414 may be generated by performing an AND operation on first serial output 410 and second serial output 412. An exemplary serial AND gate output 414 may be generated utilizing serial AND gate 434. An exemplary serial AND gate output 414 may be routed to third serial output 416 utilizing third serial multiplexer 436. In an exemplary embodiment, third serial multiplexer 436 may route serial AND gate output 414 to third serial output 416 responsive to second control sequence S2 loaded to third serial selector input 435. In an exemplary embodiment, second control sequence S2 may be equal to 010. An exemplary serial result sequence Res may be routed to fourth serial output 418 utilizing fourth serial multiplexer 438. In an exemplary embodiment, fourth serial multiplexer 438 may route serial result sequence Res to fourth serial output 418 responsive to the first element of fourth control sequence S4 loaded to fourth serial selector input 439. In an exemplary embodiment, the first element of fourth control sequence S4 may be equal to 1.

An exemplary serial adder output 420 may be updated by updating selector inverter output 440 and obtaining serial adder output 420. An exemplary selector inverter output 440 may be updated by inverting selector bit SL utilizing selector inverter 442. An exemplary serial adder output 420 may be obtained by summing third serial output 416, fourth serial output 418, and selector inverter output 440 utilizing serial adder 444. An exemplary serial adder output 420 may be updated by storing serial adder output 420 in serial shift register 402.

In an exemplary embodiment, the plurality of decrypted message bits may be obtained by summing decryption product $c_1r_2$ and second ciphertext $c_2$. In an exemplary embodiment, steps 171-177 of method 106B may be performed to generate the plurality of decrypted message bits by summing decryption product $c_1r_2$ and second ciphertext $c_2$. An exemplary $n^{th}$ second ciphertext sequence $c_2[n]$ may be routed to third serial output 416 utilizing third serial multiplexer 436. In an exemplary embodiment, third serial multiplexer 436 may route $n^{th}$ second ciphertext sequence $c_2[n]$ to third serial output 416 responsive to second control sequence S2 loaded to third serial selector input 435. In an exemplary embodiment, second control sequence S2 may be equal to 000.

An exemplary serial result sequence Res may be routed to fourth serial output 418 utilizing fourth serial multiplexer 438. In an exemplary embodiment, fourth serial multiplexer 438 may route serial result sequence Res to fourth serial output 418 responsive to the first element of fourth control sequence S4 loaded to fourth serial selector input 439. In an exemplary embodiment, the first element of fourth control sequence S4 may be equal to 1. An exemplary serial adder output 420 may be updated by summing third serial output 416, fourth serial output 418, and serial carry input 450 equal to 0. An exemplary serial adder output 420 may be updated utilizing serial adder 444. An exemplary serial result sequence Res may be updated by storing serial adder output 420 in serial shift register 402.

An exemplary serial XOR gate output 466 may be generated by performing an XOR operation on two most significant bits of serial shift register 402. An exemplary serial XOR gate output 466 may be generated utilizing a serial XOR gate 478. An exemplary $n^{th}$ decrypted message bit may be extracted from serial XOR gate output 466 by routing serial XOR gate output 466 to serial output 452. An exemplary serial XOR gate output 466 may be routed to serial output 452 utilizing sixth serial multiplexer 454.

Figure 4C:
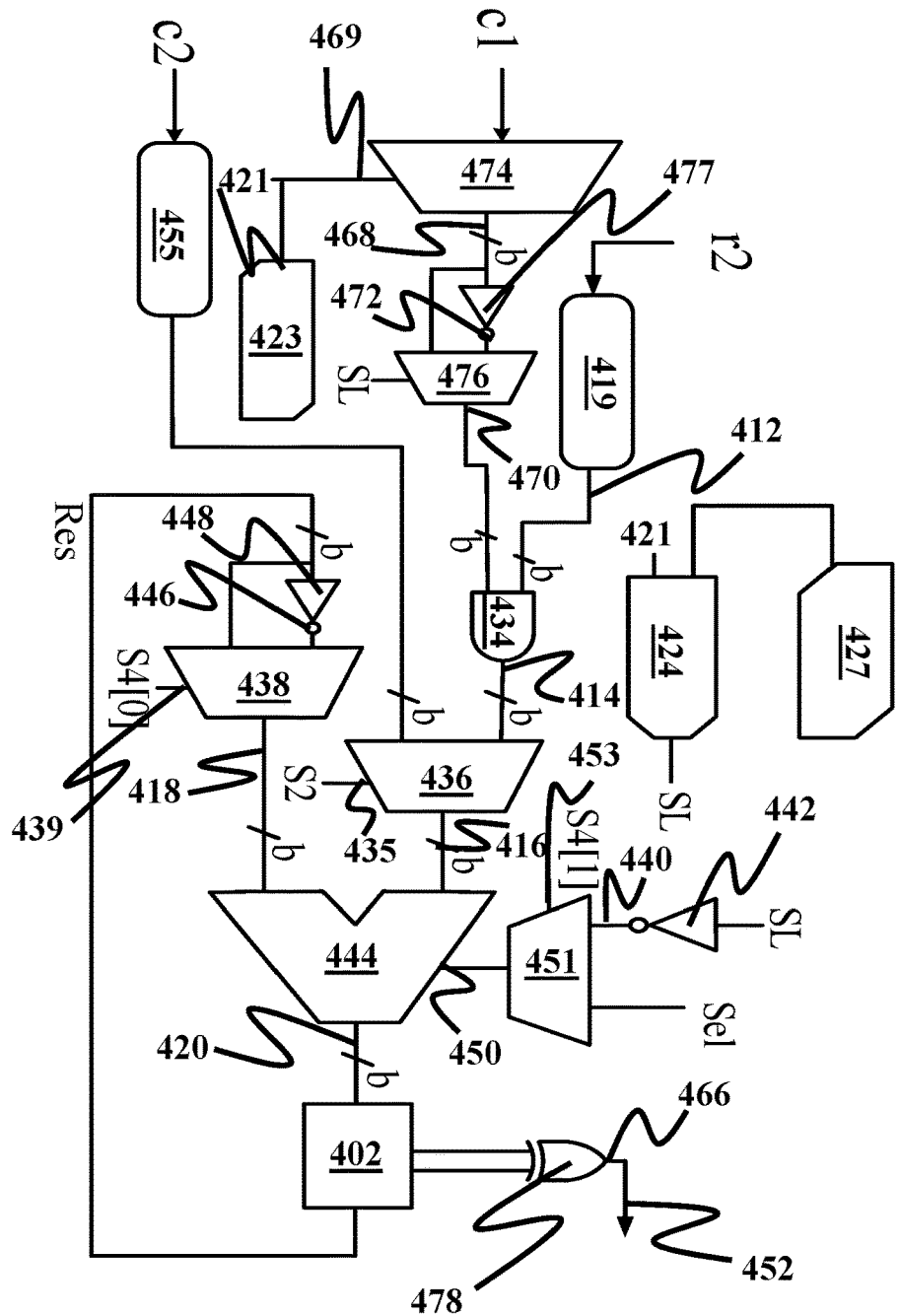
FIG. 4C shows a serial decryption logic circuit, consistent with one or more exemplary embodiments of the present disclosure.

FIG. 4C shows a serial decryption logic circuit, consistent with one or more exemplary embodiments of the present disclosure. In an exemplary embodiment, a serial decryption logic circuit 400C may include a third implementation of serial cryptoprocessing logic circuit 400. In an exemplary embodiment, parallel decryption logic circuit 300C may simultaneously obtain the plurality of decrypted message bits. On the other hand, in an exemplary embodiment, serial decryption logic circuit 400C may obtain each of the plurality of decrypted message bits one at a time. In an exemplary embodiment, different steps of method 106 may be implemented utilizing serial decryption logic circuit 400C. An exemplary $i^{th}$ private sequence $r_2[i]$ may be routed to second serial output 412 utilizing a direct connection. In other words, in an exemplary embodiments, $i^{th}$ private sequence $r_2[i]$ may be directly connected to second serial output 412. An exemplary second ciphertext output 470 may be routed to first serial output 410 utilizing a direct connection. An exemplary serial XOR gate output 466 may be routed to serial output 452 utilizing a direct connection.

Figure 5:
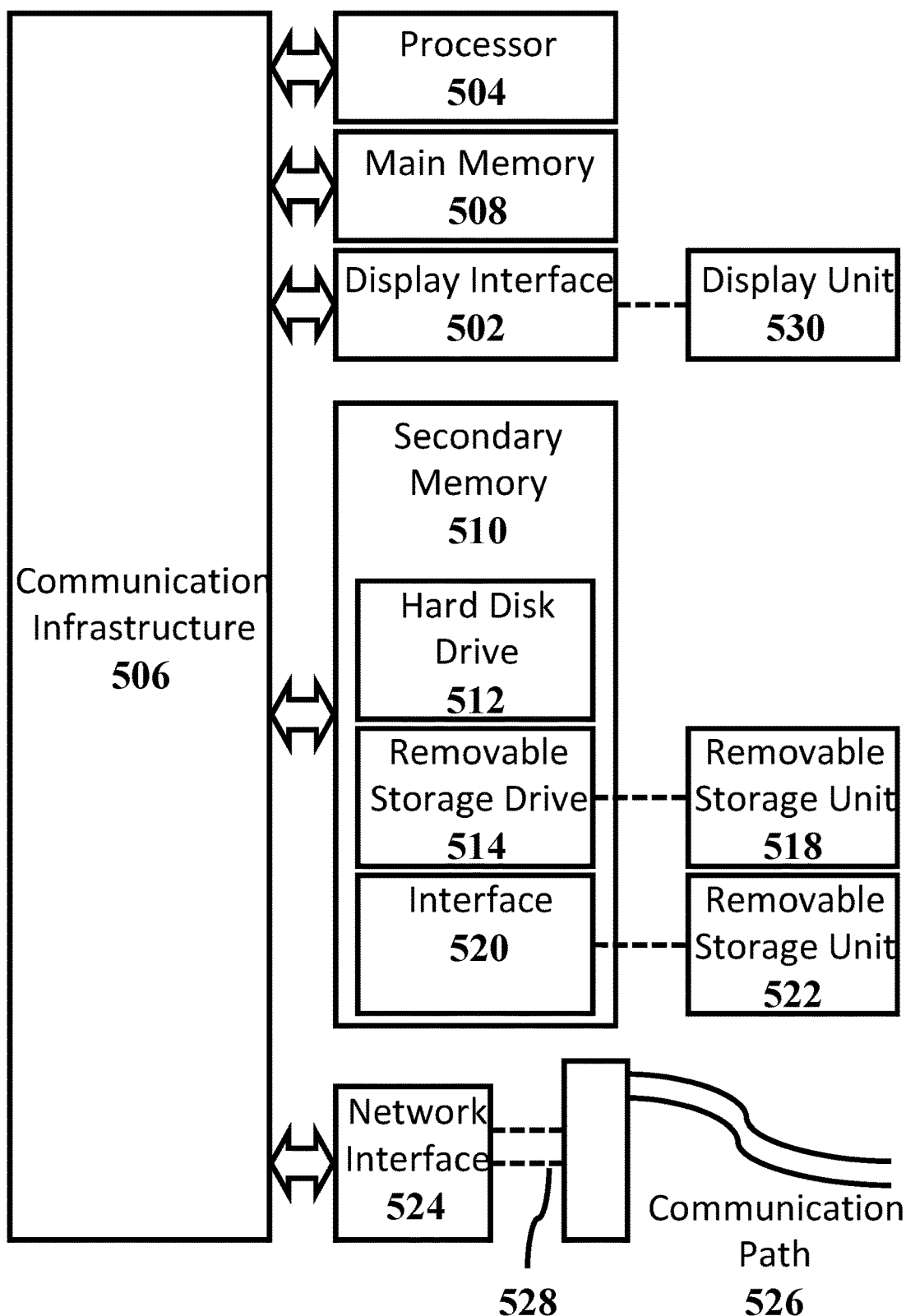
FIG. 5 shows an example computer system in which an embodiment of the present invention, or portions thereof, may be implemented as computer-readable code, consistent with exemplary embodiments of the present disclosure.

FIG. 5 shows an example computer system 500 in which an embodiment of the present invention, or portions thereof, may be implemented as computer-readable code, consistent with exemplary embodiments of the present disclosure. For example, step 108 of flowchart 102, step 132 of flowchart 104, steps 168 and 170 of flowchart 136A, and steps 153 and 155 of flowchart 136B may be implemented in computer system 500 using hardware, software, firmware, tangible computer readable media having instructions stored thereon, or a combination thereof and may be implemented in one or more computer systems or other processing systems. Hardware, software, or any combination of such may embody any of the modules and components in FIGS. 1A-1M.

If programmable logic is used, such logic may execute on a commercially available processing platform or a special purpose device. One ordinary skill in the art may appreciate that an embodiment of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

An embodiment of the invention is described in terms of this example computer system 500. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 504 may be a special purpose or a general-purpose processor device. As will be appreciated by persons skilled in the relevant art, processor device 504 may also be a single processor in a multi-core/multiprocessor system, such system operating alone, or in a cluster of computing devices operating in a cluster or server farm. Processor device 504 may be connected to a communication infrastructure 506, for example, a bus, message queue, network, or multi-core message-passing scheme.

In an exemplary embodiment, computer system 500 may include a display interface 502, for example a video connector, to transfer data to a display unit 530, for example, a monitor. Computer system 500 may also include a main memory 508, for example, random access memory (RAM), and may also include a secondary memory 510. Secondary memory 510 may include, for example, a hard disk drive 512, and a removable storage drive 514. Removable storage drive 514 may include a floppy disk drive, a magnetic tape drive, an optical disk drive, a flash memory, or the like. Removable storage drive 514 may read from and/or write to a removable storage unit 518 in a well-known manner. Removable storage unit 518 may include a floppy disk, a magnetic tape, an optical disk, etc., which may be read by and written to by removable storage drive 514. As will be appreciated by persons skilled in the relevant art, removable storage unit 518 may include a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Computer program medium and computer usable medium may also refer to memories, such as main memory 508 and secondary memory 510, which may be memory semiconductors (e.g. DRAMs, etc.).

Computer programs (also called computer control logic) are stored in main memory 508 and/or secondary memory 510. Computer programs may also be received via communications interface 524. Such computer programs, when executed, enable computer system 500 to implement different embodiments of the present disclosure as discussed herein. In particular, the computer programs, when executed, enable processor device 504 to implement the processes of the present disclosure, such as the operations in method 100 illustrated by flowchart 102 of FIG. 1B, flowchart 104 of FIG. 1E, flowchart 136A of FIG. 1G, and flowchart 136B of FIG. 1L discussed above. Accordingly, such computer programs represent controllers of computer system 500. Where an exemplary embodiment of method 100 is implemented using software, the software may be stored in a computer program product and loaded into computer system 500 using removable storage drive 514, interface 520, and hard disk drive 512, or communications interface 524.

Embodiments of the present disclosure also may be directed to computer program products including software stored on any computer useable medium. Such software, when executed in one or more data processing device, causes a data processing device to operate as described herein. An embodiment of the present disclosure may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Example 1

In this example, a performance of a cryptoprocessing method (similar to method 100) is evaluated. The method is implemented on a cryptoprocessing logic circuit (similar to parallel cryptoprocessing logic circuit 300). The cryptoprocessing logic circuit is implemented on a Virtex 6 field programmable gate array (FPGA). For q=256 and N=256, the cryptoprocessing logic circuit provides 73 quantum bits and 84 classic bits of security, respectively. Moreover, a run time of cryptoprocessing for encryption and decryption are about 1.1 µs and 0.54 µs, respectively. For q=256 and N=512, the cryptoprocessing logic circuit provides 140 quantum bits and 190 classic bits of security, respectively. Moreover, a run time of cryptoprocessing for encryption and decryption are about 2.32 µs and 1.13 µs, respectively.

Example 2

In this example, a performance of a cryptoprocessing method (similar to method 100) is evaluated. The method is implemented on a cryptoprocessing logic circuit (similar to serial cryptoprocessing logic circuit 400). The cryptoprocessing logic circuit is implemented on an application specific integrated circuit using 45 nm Nangate standard cell library. For q=256 and N=256, the cryptoprocessing logic circuit provides 84 classic bits of security. For q=256 and N=512, the cryptoprocessing logic circuit provides about 84 classic bits of security. Moreover, a run time of cryptoprocessing for encryption and decryption are about $3.8 \times 10^3$ µs and $0.54 \times 10^3$ µs, respectively. For q=256 and N=512, the cryptoprocessing logic circuit provides about 190 classic bits of security, respectively. Moreover, a run time of cryptoprocessing for encryption and decryption are about $15.2 \times 10^3$ µs and $7.6 \times 10^3$ µs, respectively.

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A logic circuit for quantum-resistant cryptoprocessing with hardware modules and components, the logic circuit comprising: a first plurality of multiplexers, an $(n,1)$h multiplexer of the first plurality of multiplexers configured to route one of an $i^{th}$ first random sequence of a plurality of first random sequences and an $i^{th}$ private sequence of a plurality of private sequences to an $(n,1)$th output utilizing a first selector input, the $i^{th}$ first random sequence comprising b bits where b is a positive integer, each bit of the $i^{th}$ first random sequence equal to an $i^{th}$ random bit of a first plurality of random bits, the ith private sequence comprising the b bits, each bit of the $i^{th}$ private sequence equal to an $i^{th}$ bit of a second plurality of bits, where n∈[0,N−1], i∈[0,N−1], and N is a number of the first plurality of bits; a second plurality of multiplexers, an $(n,2)^{th}$ multiplexer of the second plurality of multiplexers configured to route one of an $n^{th}$ public subsequence of a plurality of public subsequences, an $n^{th}$ public key sequence of a plurality of public key sequences, and an $n^{th}$ first ciphertext sequence of a plurality of first ciphertext sequences to an $(n,2)^{th}$ output utilizing a second selector input, each public subsequence of the plurality of public subsequences comprising the b its and representing a decimal number in a range of $$-\left\lfloor \frac{q}{2} \right\rfloor \text{ and } \left\lfloor \frac{q}{2} \right\rfloor - 1,$$

where q−$2^b$; a plurality of AND gates, an $n^{th}$ AND gate of the plurality of AND gates configured to generate an nth AND gate output by performing an AND operation on the $(n,1)^{th}$ output and the (n,2)th output; a third plurality of multiplexers, the $(n,3)^{th}$ multiplexer of the third plurality of multiplexers configured to route one of an nth second ciphertext sequence of a plurality of second ciphertext sequences, an $n^{th}$ temporary sequence of a plurality of temporary sequences, the $n^{th}$ AND gate output, an $n^{th}$ second random sequence of a plurality of second random sequences, an $n^{th}$ third random sequence of a plurality of third random sequences, and an $n^{th}$ message sequence of a plurality of message sequences to an $(n,3)^{th}$ output utilizing a third selector input, the $n^{th}$ temporary sequence comprising the b bits, each bit of the $n^{th}$ temporary sequence equal to an $n^{th}$ bit of the first plurality of bits, the $n^{th}$ second random sequence comprising the b bits, each bit of the $n^{th}$ second random sequence equal to an $n^{th}$ random bit of a second plurality of random bits, the $n^{th}$ third random sequence comprising the b bits, each bit of the $n^{th}$ third random sequence equal to an $n^{th}$ random bit of a third plurality of random bits, the $n^{th}$ message sequence comprising the b bits; a plurality of shift registers, an $n^{th}$ shift register configured to generate an $n^{th}$ shift register output by storing an $n^{th}$ result sequence of a plurality of result sequences, the $n^{th}$ result sequence comprising the b bits; a plurality of inverters comprising: a zeroth inverter configured to generate a zeroth inverter output by bit-wise inverting an $(N-1)^{th}$ shift register output of the plurality of shift register outputs; and a $j^{th}$ inverter configured to generate a $j^{th}$ inverter output by bit-wise inverting a (j−1)th shift register output of the plurality of shift register outputs where $j \in [1, N-1]$; a fourth plurality of multiplexers comprising: a $(0,4)^{th}$ multiplexer configured to route one of the zeroth inverter output and the $(N-1)^{th}$ shift register output to a $(0,4)^{th}$ output utilizing a fourth selector input; and a $(j,4)^{th}$ multiplexer configured to route one of the $j^{th}$ inverter output and the $(j-1)^{th}$ shift register output to a $(j,4)^{th}$ output utilizing the fourth selector input; a plurality of adders, an $n^{th}$ adder of the plurality of adders configured to generate an nth adder output by summing the $(n,3)^{th}$ output, are $(n,4)^{th}$ output, and an $n^{th}$ carry input, the nth adder output associated with the $n^{th}$ result sequence; a plurality of XOR gates, an $n^{th}$ XOR gate of the plurality of XOR gates configured to generate an $n^{th}$ XOR gate output by performing an XOR operation on two most significant bits of the $n^{th}$ result sequence; a fifth plurality of multiplexers, an $(n,5)^{th}$ multiplexer of the fifth plurality of multiplexers configured to route one of the nth result sequence and the $n^{th}$ XOR gate output to an $(n,5)^{th}$ output utilizing a fifth selector input; and a plurality of parallel outputs, an $n^{th}$ parallel output of the plurality of parallel outputs connected to the $(n,5)^{th}$ output.

2. The logic circuit of claim 1, wherein: the $(n,2)^{th}$ multiplexer is configured to route the $n^{th}$ public subsequence to the (n,2)th output responsive to a first control sequence loaded to the second selector input and the first control sequence equal to 00; the $(n,3)^{th}$ multiplexer is configured to: route the $n^{th}$ AND gate output to the $(n,3)^{th}$ output responsive to a second control sequence loaded to the third selector input and the second control sequence equal to 010; and route the $n^{th}$ temporary sequence to the $(n,3)^{th}$ output responsive to the second control sequence loaded to the third selector input and the second control sequence equal to 001; the $(n,1)^{th}$ multiplexer is configured to route the $i^{th}$ private sequence to the $(n,1)^{th}$ output responsive to a third control sequence loaded to the first selector input and the third control sequence equal to 1; the $(0,4)^{th}$ multiplexer is configured to route the zeroth inverter output to the $(0,4)^{th}$ output responsive to a first element of a fourth control sequence loaded to the fourth selector input and the first element of the fourth control sequence equal to 0; the $(j,4)^{th}$ multiplexer is configured to: route the $(j-1)^{th}$ shift register output to the $(j,4)^{th}$ output responsive to a second element of the fourth control sequence loaded to the fourth selector input and the second element of the fourth control sequence equal to 1; and route the $j^{th}$ inverter output to the $(j,4)^{th}$ output responsive to the second element of the fourth control sequence loaded to the fourth selector input and the second element of the fourth control sequence equal to 0; a zeroth adder of the plurality of adders is configured to generate a zeroth adder output responsive to a first element of a fifth control sequence loaded into a zeroth carry input and the first element of the fifth control sequence equal to 1, the $(n,5)^{th}$ multiplexer of the fifth plurality of multiplexers is configured to route the nth result sequence to the $(n,5)^{th}$ output responsive to a sixth control sequence loaded to the fifth selector input and the sixth control sequence equal to 0; and a $j^{th}$ adder of the plurality of adders is configured to generate a $j^{th}$ adder output responsive to a second element of the fifth control sequence loaded to a $j^{th}$ carry input and the second element of the fifth control sequence equal to one of 0 or 1.

3. The logic circuit of claim 2, wherein: the $(n,1)^{th}$ multiplexer is configured to route the $i^{th}$ first random sequence to the (n,1)th output responsive to the third control sequence loaded to the first selector input and the third control sequence equal to 0; the $(n,2)^{th}$ multiplexer is configured to: route the $n^{th}$ public subsequence to the $(n,2)^{th}$ output responsive to the first control sequence loaded to the second selector input and the first control sequence equal to 00; and route the nth public key sequence to the $(n,2)^{th}$ output responsive to the first control sequence loaded to the second selector input and the first control sequence equal to 01; the $(n,3)^{th}$ multiplexer is configured to; route the $n^{th}$ AND gate output to the $(n,3)^{th}$ output responsive to the second control sequence loaded to the third selector input and the second control sequence equal to 010; route the $n^{th}$ second random sequence to the $(n,3)^{th}$ output responsive to the second control sequence loaded to the third selector input and the second control sequence equal to 011; route the $n^{th}$ third random sequence to the $(n,3)^{th}$ output responsive to the second control sequence loaded to the third selector input and the second control sequence equal to 100; and route the $n^{th}$ message sequence to the $(n,3)^{th}$ output responsive to the second control sequence loaded to the third selector input and the second control sequence equal to 101; the $(0,4)^{th}$ multiplexer is configured to: route the zeroth inverter output to the $(0,4)^{th}$ output responsive to the first element of the fourth control sequence loaded to the fourth selector input and the first element of the fourth control sequence equal to 0; and route the $(N-1)^{th}$ shift register output to the $(0,4)^{th}$ output responsive to the first element of the fourth control sequence loaded to the fourth selector input and the first element of the fourth control sequence equal to 1; the $(j,4)^{t}h$ multiplexer is configured to route the $(j-1)^{t}h$ shift register output to the $(j,4)^{th}$ output responsive to a second element of the fourth control sequence loaded to the fourth selector input and the second element of the fourth control sequence equal to 1; the $(n,5)^{th}$ multiplexer is configured to route the $n^{th}$ result sequence to the $(n,5)^{th}$ output responsive to the sixth control sequence loaded to the fifth selector input and the sixth control sequence equal to 0; the $j^{th}$ adder is configured to generate the $j^{th}$ adder output responsive to the second element of the fifth control sequence loaded to the $j^{th}$ carry input and the second element of the fifth control sequence equal to 0; and the zeroth adder configured to generate the zeroth adder output responsive to the first element of the fifth control sequence loaded into the zeroth carry input, and the first element of the fifth control sequence equal to 0 or 1.

4. The logic circuit of claim 2, wherein: the $(n,1)^{th}$ multiplexer is configured to route the $i^{th}$ private sequence to the $(n,1)^{th}$ output responsive to the third control sequence loaded to the first selector input and the third control sequence equal to 1; the $(n,2)^{th}$ multiplexer is configured to route the $n^{th}$ first ciphertext sequence to the $(n,2)^{th}$ output responsive to the first control sequence loaded to the second selector input and the first control sequence equal to 10; the $(n,3)^{th}$ multiplexer is configured to: route the $n^{th}$ AND gate output to the $(n,3)^{th}$ output responsive to the second control sequence loaded to the third selector input and the second control sequence equal to 010; and route the nth second ciphertext sequence to the $(n,3)^{th}$ output responsive to the second control sequence loaded to the third selector input and the second control sequence equal to 000; the $(0,4)^{th}$ multiplexer is configured to: route the zeroth inverter output to the $(0,4)^{th}$ output responsive to the first element of the fourth control sequence loaded to the fourth selector input and the first element of the fourth control sequence equal to 0; and route the $(N-1)^{th}$ shift register output to the $(0,4)^{th}$ output responsive to the first element of the fourth control sequence loaded to the fourth selector input and the first element of the fourth control sequence equal to 1; the $(j,4)^{th}$ multiplexer is configured to route the $(j-1)^{th}$ shift register output to the $(j,4)^{th}$ output responsive to a second element of the fourth control sequence loaded to the fourth selector input and the second element of the fourth control sequence equal to 1; the $j^{th}$ adder is configured to generate the $j^{th}$ adder output responsive to the second element of the fifth control sequence loaded to the $j^{th}$ carry input and the second element of the fifth control sequence equal to 0; the zeroth adder is configured to generate the zeroth adder output responsive to the first element of the fifth control sequence loaded into the zeroth carry input and the first element of the fifth control sequence equal to 0 or 1; and the (n,5)th multiplexer is configured to route the $n^{th}$ XOR gate output to the $(n,5)^{th}$ output responsive to the sixth control sequence loaded to the fifth selector input and the sixth control sequence equal to 1.

\* \* \* \* \*